United States Patent
Kobayashi

(10) Patent No.: US 7,623,262 B2
(45) Date of Patent: Nov. 24, 2009

(54) DETERMINING IF THE PHOTOELECTRIC CONVERSION ELEMENT IS DEFECTIVE

(75) Inventor: Kenji Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 11/524,696

(22) Filed: Sep. 20, 2006

(65) Prior Publication Data

US 2007/0064282 A1  Mar. 22, 2007

(30) Foreign Application Priority Data

Sep. 20, 2005 (JP) ............................... 2005-272479

(51) Int. Cl.
 *H04N 1/00* (2006.01)
 *H04N 1/04* (2006.01)

(52) U.S. Cl. ........................................ 358/1.6; 358/474

(58) Field of Classification Search ................. 358/474, 358/475, 482, 483, 487, 505, 506, 509, 512, 358/513, 514, 1.1, 1.6, 1.9, 504, 510, 511, 358/520, 468, 476, 480, 481, 486, 489, 490, 358/491, 493, 494, 495, 496, 497, 302, 406; 399/16, 17, 18, 26, 47, 48, 50, 377, 378; 382/260, 261, 262, 263, 264, 265, 312, 318, 382/319; 355/75
See application file for complete search history.

(56) References Cited

U.S. PATENT DOCUMENTS

| 4,330,775 | A | * | 5/1982 | Iwamoto et al. | ............. | 382/141 |
| 6,249,362 | B1 | * | 6/2001 | Sato et al. | .................... | 358/527 |
| 6,512,217 | B1 | * | 1/2003 | Kameshima | ............. | 250/208.1 |

FOREIGN PATENT DOCUMENTS

| JP | 09-018663 | | 1/1997 |
| JP | 10-276305 | | 10/1998 |
| JP | 10-276368 | | 10/1998 |
| JP | 10322513 | A * | 12/1998 |
| JP | 2001-159793 | | 6/2001 |
| JP | 2007067475 | A * | 3/2007 |
| JP | 2007088616 | A * | 4/2007 |

* cited by examiner

*Primary Examiner*—Dov Popovici
(74) *Attorney, Agent, or Firm*—Nutter McClennen & Fish LLP; John J. Penny, Jr.

(57) ABSTRACT

An original holder of an image reading apparatus that reads and image of an original based on an amount of an electric charge generated by a photoelectric conversion element due to received light, when the original placed on a placement surface is illuminated by a light source, including an original holder body placed on the placement surface while holding the original so as to position the original on the replacement surface and a filter member with a predetermined transmittance that transmits light from the light source to be received by the photoelectric conversion element.

7 Claims, 28 Drawing Sheets

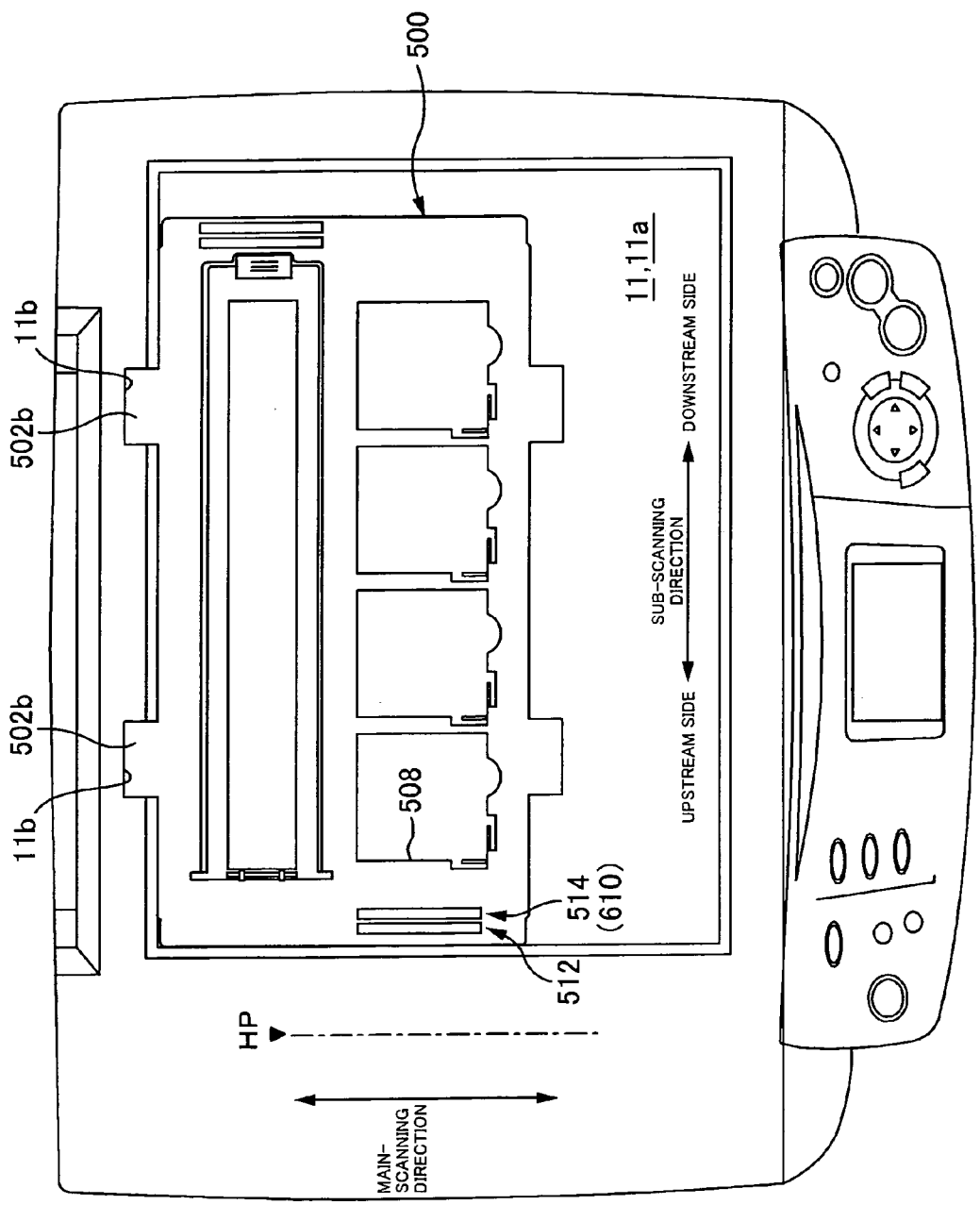

POSITION IN MAIN-SCANNING DIRECTION OF PHOTODIODE

DETERMINING IF THE PHOTOELECTRIC CONVERSION ELEMENT IS DEFECTIVE

CROSS-REFERENCE TO RELATED APPLICATIONS

The present application claims priority upon Japanese Patent Application No. 2005-272479 filed on Sep. 20, 2005, which is herein incorporated by reference.

BACKGROUND

1. Technical Field

The present invention relates to an image reading apparatus and an original holder of the same.

2. Related Art

An image reading apparatus such as a scanner is provided with an image sensor for reading images from an original. Such an image sensor is provided with a plurality of photoelectric conversion elements such as a photodiode, and these photoelectric conversion elements generate electric charges in an amount corresponding to the amount of light received. Images are read by detecting this electric charge amount (see JP A-10-276305 and JP A-10-276368).

However, image sensors may have a following problem, that is, when electric charges generated by photoelectric conversion elements are transferred to a detection section to detect the amount of the electric charges, part of the electric charges may remain in a transfer path or the like, and all the electric charges may not be transferred to the detection section.

This type of problem is called a "linearity defect". When the linearity defect occurs, in the read image, a defective image streak appears in a portion of which a photoelectric conversion element subject to the linearity defect takes charge. As a result, the read image becomes inadequate.

Accordingly, inspecting the linearity defect is examined as one of pre-shipment inspections at the manufacturing line of the image forming apparatuses. If a photoelectric conversion element subject to the linearity defect is found, the positional information of such a photoelectric conversion element is stored in a memory or the like of the image forming apparatus. When an image is read by a user after shipment, read data based on the photoelectric conversion element subject to the linearity defect that is identified by the positional information is not used, and instead, the data corresponding to the position is generated by interpolation using the read data of the photoelectric conversion elements that are located on both the adjacent sides of the photoelectric conversion element subject to the linearity defect so as to compensate for the defective image streak.

However, the occurrence of the linearity defect is temperature-dependent, and therefore even a photoelectric conversion element that had a favorable evaluation in the pre-shipment inspection at the manufacturing line may cause the linearity defect depending on the use temperature environment after shipment. In other words, it is considered that specifying photoelectric elements that may cause a defective image due to the linearity defect without fail is difficult only by the pre-shipment inspections.

SUMMARY

An advantage of some aspects of the present invention is that it is possible to achieve an image reading apparatus and an original holder of the same that can specify photoelectric conversion elements that may cause a defective image due to the linearity defect without fail.

An aspect of the invention is an image reading apparatus that performs a reading operation of an image from an original including:

a light source for illuminating the original;

a plurality of photoelectric conversion elements that each generate an electric charge in an amount corresponding to an amount of light received;

a read data generating section that generates read data of the image based on an amount of the electric charges generated by the photoelectric conversion elements due to the light received when the original is illuminated by the light source; and a determination section that determines whether or not the photoelectric conversion element is defective based on the amount of the electric charges generated by the photoelectric conversion elements when the photoelectric conversion element receives a predetermined amount of light, during a period from power-up to the reading operation.

Other features of the present invention will be made clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings.

FIG. 9 is a diagram illustrating a state in which the transparent original 5B is placed on a placement surface 11a.

FIG. 11C is a top view of the transparent original holder 500.

DESCRIPTION OF EXEMPLARY EMBODIMENTS

Figure 1:
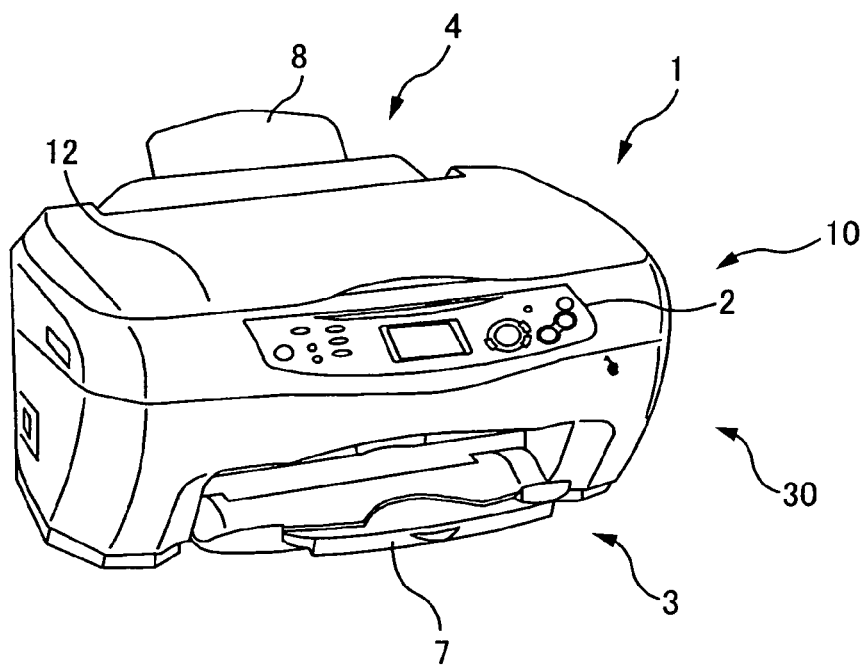
FIG. 1 is an external perspective view of a multifunction apparatus 1.

At least the following matters will be made clear by the explanation in the present specification and the description of the accompanying drawings.

An image reading apparatus that performs a reading operation of an image from an original including:
 a light source for illuminating the original;
 a plurality of photoelectric conversion elements that each generate an electric charge in an amount corresponding to an amount of light received;
 a read data generating section that generates read data of the image based on an amount of the electric charges generated by the photoelectric conversion elements due to the light received when the original is illuminated by the light source; and
 a determination section that determines whether or not the photoelectric conversion element is defective based on the amount of the electric charge generated by the photoelectric conversion element when the photoelectric conversion element receives a predetermined amount of light, during a period from power-up to the reading operation.

In such an image reading apparatus, the determination section determines the linearity defect during a period from the power-up to the reading operation (specifically, determines whether or not an photoelectric conversion element is defective based on the amount of electric charge that the photoelectric conversion element generates when receiving the predetermined amount of light).

Therefore, even if the use environment is changed after shipment for a reason on the user's side, since the linearity defect is determined under such an environment, it is possible to specify photoelectric conversion elements that may be subject to the linearity defect under the environment. In other words, it is possible to specify photoelectric conversion elements that may cause a defective image due to the linearity defect regardless of the change of the use environment.

In such an image reading apparatus,
 it is preferable that the determination is performed at every power-up.

In such an image reading apparatus, the linearity defect is determined every time the apparatus is powered on. Therefore, it is possible to specify photoelectric conversion elements that may cause a defective image due to the linearity defect regardless of the daily change of the use environment at the user's side after shipment.

In such an image reading apparatus,
 it is preferable that the determination is performed before the initial reading operation by the photoelectric conversion element.

In such an image reading apparatus, the determination is performed before the initial reading operation. Therefore, it is possible to specify more certainly photoelectric conversion elements that may cause a defective image due to the linearity defect under such environment.

The reason for this is as follows. The linearity defect tends to occur more frequently as the temperature becomes lower. After the power-up, the internal temperature of the image reading apparatus increases along with the electricity consumption. Based on this, the time "before the initial reading operation" is the time at which the internal temperature of the image reading apparatus is the lowest. Therefore, if the linearity defect is determined at this time, there is little possibility that the linearity defect occurs later to the photoelectric conversion element that had a favorable evaluation in the detection at that time. As a result, it is guaranteed that the photoelectric conversion element that may cause a defective image is specified without fail.

In such an image reading apparatus,
 it is preferable that the image reading apparatus includes a memory for storing information related to the photoelectric conversion element that is determined to be defective, and the information stored in the memory is updated at every determination.

With such an image reading apparatus, even if the photoelectric conversion element subject to the linearity defect may change with time, it is possible to specify without fail the photoelectric conversion element subject to the linearity defect substantially at the current moment by referring to the memory, which is convenient in subsequent actions.

In such an image reading apparatus, it is preferable that the photoelectric conversion element that is determined to be defective is specified based on the information in the memory, and read data based on an electric charge of the photoelectric conversion element that is determined to be defective is obtained by interpolation with read data based on electric charge amounts of photoelectric conversion elements located on both adjacent sides of the photoelectric conversion element that is determined to be defective.

With such an image reading apparatus, the read image can be constituted without using abnormal values of the read data caused by defective photoelectric conversion elements. As a result, a defective read image can be prevented.

In such an image reading apparatus, it is preferable that the determination is performed only before the initial reading operation by the photoelectric conversion elements, and the determination is not performed for a subsequent reading operation, and in the subsequent reading operation, the photoelectric conversion element that is determined to be defective is specified based on the information in the memory.

In such an image reading apparatus, the determination is performed before the initial reading operation only, and not performed for subsequent reading operations. Therefore, the throughput of the subsequent reading operations can be improved.

In such an image reading apparatus, it is preferable that the determination is performed based on each deviation between an electric charge amount generated by a photoelectric conversion element subject to determination and respective electric charge amounts generated by photoelectric conversion elements located on both adjacent sides of the photoelectric conversion element subject to determination.

With such an image reading apparatus, it is possible to accurately specify photoelectric conversion elements subject to the linearity defect. This is because the linearity defect is more likely to occur in an independent photoelectric conversion element, and there is a little possibility that the linearity defect occurs over a plurality of the adjacent photoelectric conversion elements. Therefore, it is possible to accurately specify photoelectric conversion elements subject to the linearity defect through the comparison with the photoelectric conversion elements on both adjacent sides.

In such an image reading apparatus, it is preferable that in the determination, the amount of light from the light source is reduced to the predetermined amount by transmitting the light from the light source through a filter member with a predetermined transmittance, and is received by the photoelectric conversion element.

With such an image reading apparatus, it is possible to generate easily the predetermined amount of light to be illuminated on the photoelectric conversion element in the linearity defect determination, by a simple method of using a filter member with a predetermined transmittance.

In such an image reading apparatus, it is preferable that the filter member is a film body.

With such an image reading apparatus, since the film body is used as the filter member, handling is easy when determining the linearity defect.

In such an image reading apparatus, it is preferable that a plurality of the photoelectric conversion elements are arranged lined up along a predetermined direction, and wherein the reading operation of an image from the original is performed by a plurality of the photoelectric conversion elements moving along a direction that intersects the predetermined direction.

In such an image reading apparatus, it is preferable that the image reading apparatus includes a detection section that outputs a signal in a magnitude corresponding to an amount of an electric charge that is detected, and wherein the electric charges generated by a plurality of the photoelectric conversion elements are transferred to the detection section through a predetermined transfer path.

With such an image reading apparatus, since electric charge may remain in the transfer path, the linearity defect easily occurs to photoelectric conversion elements. Therefore, effects of the present invention can be enjoyed more efficiently.

In such an image reading apparatus, it is preferable that a plurality of the photoelectric conversion elements respectively include a photodiode for receiving red light, a photodiode for-receiving blue light, and a photodiode for receiving green light, and transfer distances from these three photodiodes to the detection section are different from one another.

With such an image reading apparatus, since the transfer distance to the detection section differs from one another in the three photodiodes, photodiodes whose transfer distance to the detection section is long exist. Therefore, the linearity defect occurs more easily to photoelectric conversion elements, and effects of the present invention can be enjoyed more efficiently.

An image reading apparatus that performs a reading operation of an image from an original including:

a light source for illuminating the original;

a plurality of photoelectric conversion elements that each generate an electric charge in an amount corresponding to an amount of light received;

a read data generating section that generates read data of the image based on an amount of the electric charges generated by the photoelectric conversion elements due to the light received when the original is illuminated by the light source; and a determination section that determines whether or not the photoelectric conversion element is defective based on the amount of the electric charge generated by the photoelectric conversion element when the photoelectric conversion element receives a predetermined amount of light, during a period from power-up to the reading operation, wherein the determination is performed at every power-up, the determination is performed before the initial reading operation by the photoelectric conversion element, the image reading apparatus includes a memory for storing information related to the photoelectric conversion element that is determined to be defective, wherein the information stored in the memory is updated at every determination, the photoelectric conversion element that is determined to be defective is specified based on the information in the memory, and read data based on an electric charge of the photoelectric conversion element that is determined to be defective is obtained by interpolation with read data based on electric charge amounts of photoelectric conversion elements located on both adjacent sides of the photoelectric conversion element that is determined to be defective, the determination is performed based on each deviation between an electric charge amount generated by a photoelectric conversion element subject to determination and respective electric charge amounts generated by photoelectric conversion elements located on both adjacent sides of the photoelectric conversion element subject to determination, and in the determination, the amount of light from the light source is reduced to the predetermined amount by transmitting the light from the light source through a filter member with a predetermined transmittance, and is received by the photoelectric conversion element, the filter member is a film body, a plurality of the photoelectric conversion elements are arranged lined up along a predetermined direction, and the reading operation of an image from the original is performed by a plurality of the photoelectric conversion elements moving along a direction that intersects the predetermined direction, the image reading apparatus includes a detection section that outputs a signal in a magnitude corresponding to an amount of an electric charge that is detected, and the electric charges generated by a plurality of the photoelectric conversion elements are transferred to the detection section through a predetermined transfer path, and a plurality of the photoelectric conversion elements respectively include a photodiode for receiving red light, a photodiode for receiving blue light, and a photodiode for receiving green light, and transfer distances from these three photodiodes to the detection section are different from one another.

With such an image reading apparatus, all the effects stated above can be achieved, and therefore the object of the present invention is achieved effectively.

An original holder of an image reading apparatus that reads an image of an original based on an amount of an electric charge generated by a photoelectric conversion element due to received light, when the original placed on a placement surface is illuminated by a light source, including:

an original holder body placed on the placement surface while holding the original so as to position the original on the placement surface; and a filter member with a predetermined transmittance for transmitting light from the light source to be received by the photoelectric conversion element, so as to determine whether or not the photoelectric conversion element is defective based on the amount of the electric charge generated by the photoelectric conversion element due to the received light.

In such an original holder, the filter member for determining the linearity defect is provided. Therefore, the linearity defect can be determined when reading an image from an original held by the original holder, and it is possible to specify photoelectric conversion elements that may cause a defective image due to the linearity defect without fail during the reading operation.

Since the original holder is provided with the filter member, the possibility that the filter member is lost is low.

In such an original holder, it is preferable that the filter member is a film body.

In such an original holder, since the film body is used as the filter member, it is possible to suppress increase in size of the external dimension of the original holder due to addition of the filter member, and therefore a compact original holder can be provided.

In such an original holder, it is preferable that the original is a transparent original, and the photoelectric conversion element receives the light from the light source that has been transmitted through the transparent original, when reading an image from the original.

In such an original holder, it is preferable that the photoelectric conversion elements are arranged lined up along a predetermined direction, the reading operation of an image from the original is performed by the photoelectric conversion element moving in a direction that intersects the predetermined direction, at the power-up, the photoelectric conversion element stops at a predetermined standby position in the predetermined direction, and when the original holder body is placed on the placement surface, the filter member is provided at a portion that is closer to the standby position than the original.

With such an original holder, when the linearity defect is determined during a series of operations performed in the image reading operation, the transfer distance in the predetermined direction of the photoelectric conversion element can be shortened, and therefore it is possible to finish the series of operations in a short time.

In such an original holder, it is preferable that a length in the predetermined direction of the filter member is set to a length that exceeds an image of the original in the predetermined direction.

With such an original holder, by placing the original holder on the placement surface only one time, the linearity defect can be determined for all the photoelectric conversion elements used for reading an image from the original without changing the placement position.

In such an original holder, it is preferable that of a pair of engagement sections that engage with each other, one of the engagement sections is formed on the placement surface, and the other engagement section is formed in the original holder body, and in a state in which the engagement sections are engaged with each other, the position of the original held by the original holder body is positioned at a position in which the image of the original can be read by the photoelectric conversion element.

With such an original holder, it is possible to read an image from the original by photoelectric conversion elements without fail.

An original holder of an image reading apparatus that reads an image of an original based on an amount of an electric charge generated by a photoelectric conversion element due to received light, when the original placed on a placement surface is illuminated by a light source, including:

an original holder body placed on the placement surface while holding the original so as to position the original on the placement surface; and a filter member with a predetermined transmittance for transmitting light from the light source to be received by the photoelectric conversion element, so as to determine whether or not the photoelectric conversion element is defective based on the amount of the electric charge generated by the photoelectric conversion element due to the received light, wherein the filter member is a film body, and the original is a transparent original, the photoelectric conversion element receives the light from the light source that has been transmitted through the transparent original, when reading an image from the original, the photoelectric conversion elements are arranged lined up along a predetermined direction, the reading operation of an image from the original is performed by the photoelectric conversion element moving in a direction that intersects the predetermined direction, at the power-up, the photoelectric conversion element stops at a predetermined standby position in the predetermined direction, and when the original holder body is placed on the placement surface, the filter member is provided at a portion that is closer to the standby position than the original, a length in the predetermined direction of the filter member is set to a length that exceeds an image of the original in the predetermined direction, and of a pair of engagement sections that engage with each other, one of the engagement sections is formed on the placement surface, and the other engagement section is formed in the original holder body, and in a state in which the engagement sections are engaged with each other, the position of the original held by the original holder body is positioned at a position in which the image of the original can be read by the photoelectric conversion element.

With such an original holder, all the effects stated above can be achieved, and therefore the object of the present invention is achieved effectively.

Outline of the Image Reading Apparatus 1

An image reading apparatus 1 according to the present embodiment is described using a multifunction apparatus 1 provided with an image sensor that includes photoelectric conversion elements as an example. This multifunction apparatus 1 is provided with a scanner function for reading an image from an original 5 and generating image data, a printer function for performing printing on various media S such as print paper based on print data transmitted from a host computer (not shown), and a local copy function for printing to copy an image read from the original 5 onto the medium S.

An external perspective view of the multifunction apparatus 1 is shown in FIG. 1. The multifunction apparatus 1 is provided with a scanner section 10 for reading an image from the original 5 in an upper portion thereof, and a printer section 30 for performing printing onto the medium S such as print paper at a lower portion thereof. In the front surface portion of the multifunction apparatus 1, an operation panel 2 is provided.

Figure 2:
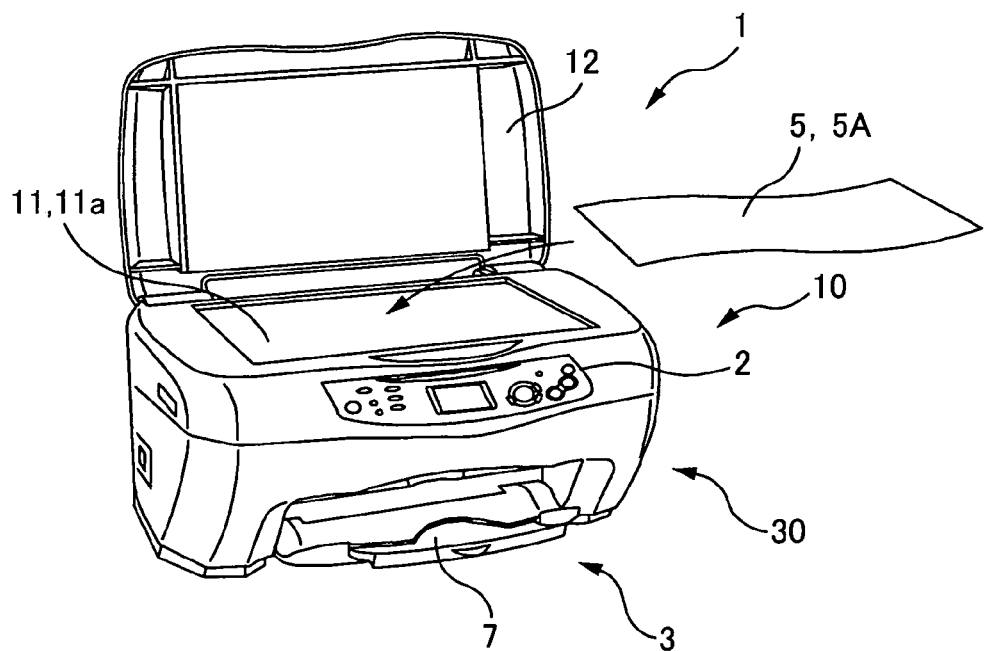
FIG. 2 is a perspective view for describing the outline of a scanner 10.

FIG. 2 illustrates a perspective view for describing the outline of the scanner section 10. The scanner section 10 is provided with an original table 11 for placing the original 5, and an original table cover 12 that covers the original table 11 from above. The original table 11 includes a glass plate, the upper surface of which serves as a placement surface 11a on which the original 5 is placed. The original table cover 12 is attached pivotably at a rear end portion of the multifunction apparatus 1 so that the placement surface 11a is opened and closed.

The printer section 30 includes a paper-supply section 4 at a rear portion of the multifunction apparatus 1, and a paper-discharge section 3 in a front portion of the multifunction apparatus 1. The printer section 30 sequentially performs printing onto the medium S such as print paper that is set in a paper-supply tray 8 of the paper-supply section 4, and discharges the printed medium S to a paper-discharge tray 7 of the paper-discharge section 3.

Internal Mechanism of the Scanner Section 10 and the Printer Section 30

Figure 3:
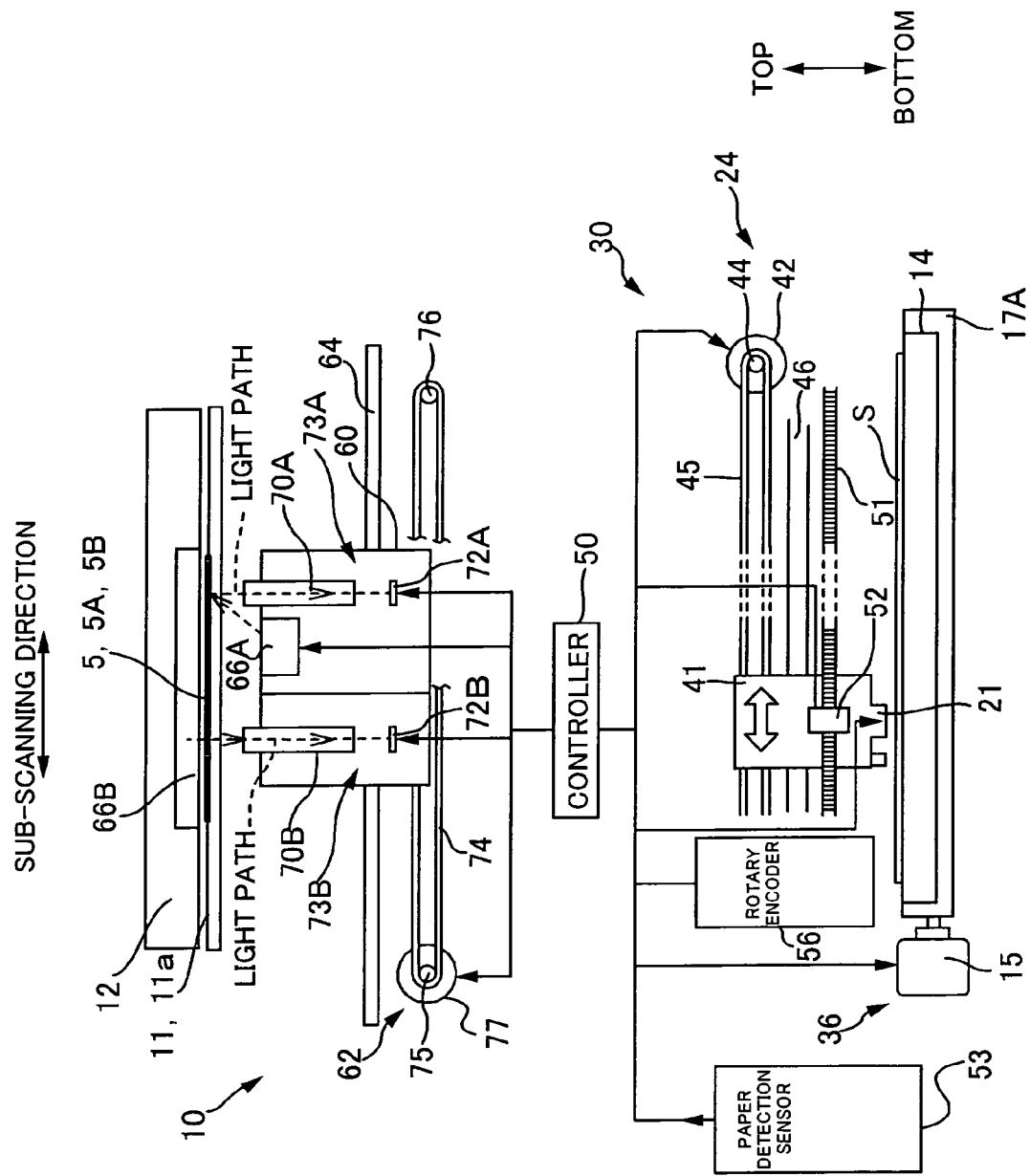
FIG. 3 is an explanatory diagram of the internal mechanism of the scanner 10 and a printer 30.
Figure 4:
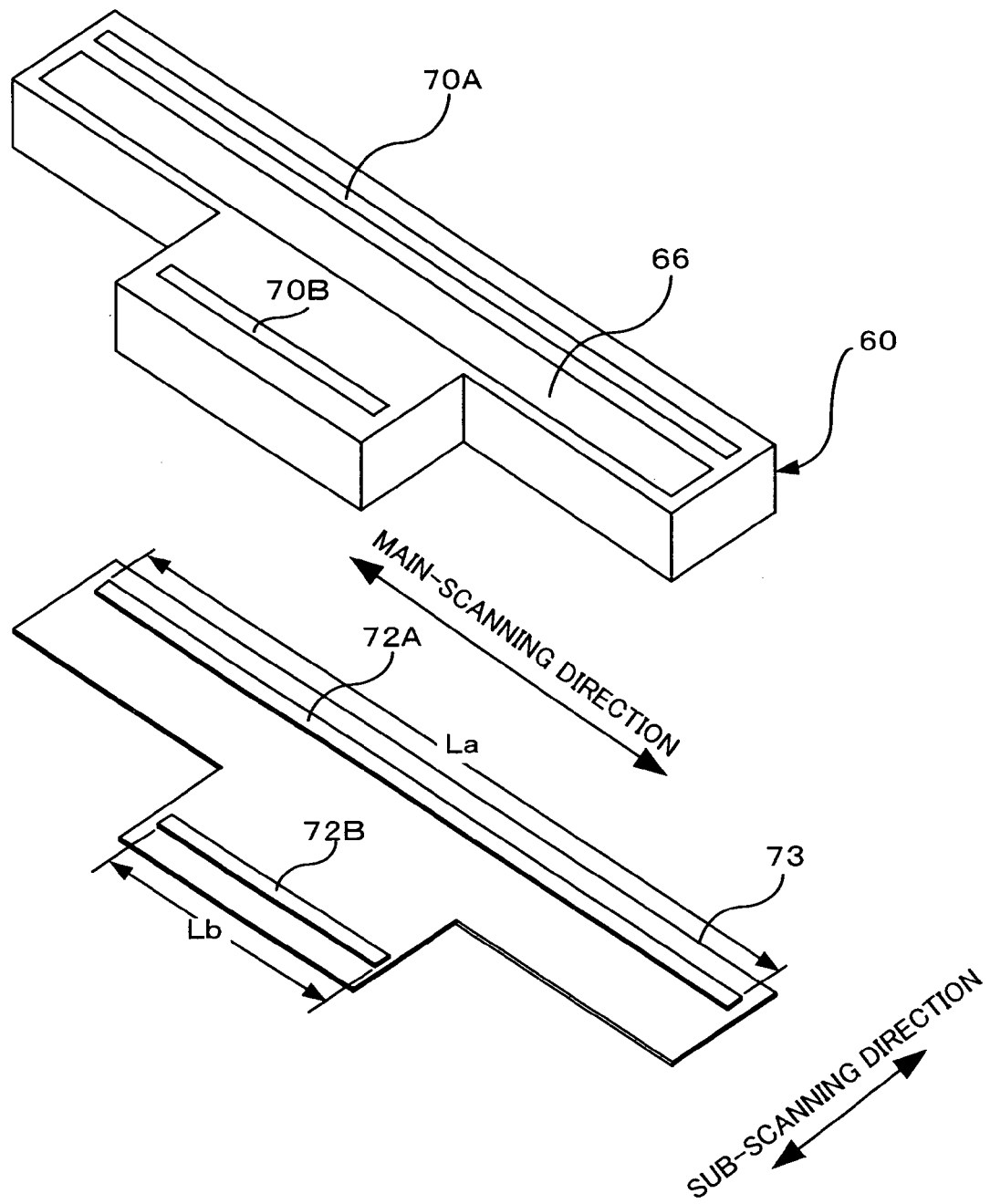
FIG. 4 is an exploded perspective view of a scanner carriage 60 in the scanner 10.

FIG. 3 is an explanatory diagram of the internal mechanism of the scanner section 10 and the printer section 30. FIG. 4 is an exploded perspective view of a scanner carriage 60 of the scanner section 10.

Scanner Section

As shown in the upper portion of FIG. 3, the scanner 10 is provided below the original table 11 with the scanner carriage 60, a driving mechanism 62 that moves the scanner carriage 60 in a sub-scanning direction, in parallel with the placement surface 11a of the original table 11 while maintaining a predetermined distance with respect to the same, and a guide rail 64 that supports the scanner carriage 60 and guides the movement of the scanner carriage 60.

The scanner carriage 60 is provided with a reflecting original reading section 73A for reading images from a reflecting original 5A such as photographs, printed materials or the like, and a transparent original reading section 73B for reading images from a transparent original 5B such as photographic films or the like.

The reflecting original reading section 73A includes a reflecting original light source 66A for emitting light onto the reflecting original 5A placed on the placement surface 11a, a lens 70A into which reflection light reflected by the reflecting original 5A enters, and an image sensor 72A for receiving the reflection light through the lens 70A. The reflecting original light source 66A is light emitting diodes in three colors, RGB for example (hereinafter referred to as the "LED"). The LEDs of the respective colors are alternately switched to emit light, red (R), green (G) and blue (B) lights are emitted in sequence at a predetermined cycle, and the reflection light from the reflecting original 5A enters the image sensor 72A as separated into the respective color components of RGB.

The transparent original reading section 73B includes a lens 70B into which transmitted light that has been transmitted through the transparent original 5B placed on the placement surface 11a enters, and an image sensor 72B for receiving the transmitted light through the lens 70B. It should be noted that a light source 66B for the transparent original reading section 73B (hereinafter referred to as the "transparent original light source") is a white light source that emits white light such as a mercury lamp, and the transmitted light that has been transmitted through the transparent original 5B enters the image sensor 72B without being separated into the respective RGB color components. In addition, the transparent original light source 66B is housed not in the scanner carriage 60, but in the back surface of the original table cover 12. Therefore, the light can be transmitted through the transparent original 5B in a state in which the original table cover 12 covers the placement surface 11a.

The image sensor 72A and the image sensor 72B are both constituted by a linear CCD sensor in which a plurality of photoelectric conversion elements such as a photodiode that convert light signals into electric signals are arranged in a row along a main-scanning direction (direction perpendicular to the sub-scanning direction).

It should be noted that in the present embodiment, a configuration of a contact-type image sensor (CIS image sensor) is adopted, and therefore as shown in FIG. 4, the width dimensions in the main-scanning direction of the image sensor 72A and the image sensor 72B differ from each other. The respective width dimensions La and Lb are set corresponding to the size of an original to be read. In other words, the width La in the main-scanning direction of the image sensor 72A for the reflecting original is set a little wider than the maximum assumed width of the reflecting original 5A, whereas the width Lb in the main-scanning direction of the image sensor 72B for the transparent original is set a little wider than the maximum assumed width of the transparent original 5B.

In addition, due to the difference in type of the light sources 66A and 66B described above, the type of the photodiode as the photoelectric conversion element also differs between the image sensor 72A and the image sensor 72B. Specifically, a monochrome photodiode is used as the light receiving conversion element in the image sensor 72A since it receives the reflection light from the reflecting original 5A as separated on the LED light source side into three color components of RBG. In contrast, the image sensor 72B receives the transmitted light from the transparent original 5B as white light that is not separated into the respective RGB color components. Thus, it is necessary to separate the received transmitted light into the respective RGB color components on the image sensor 72A side, and color filters in three colors of RGB and photodiodes are used as the light receiving conversion element. These photoelectric conversion elements are described later. In the description below, for the purpose of convenience, the color filters are omitted and photodiodes are assumed to receive the light of the respective colors.

As shown in FIG. 3, the driving mechanism 62 is provided with a timing belt 74 that is connected to the scanner carriage 60, a pair of pulleys 75 and 76 between which the timing belt 74 is extended, and a driving motor 77 that rotationally drives one of the pulleys 75. The driving motor 77 is driven controlled by control signals from the controller 50.

Printer Section 30

As shown in the lower portion of FIG. 3, the printer section 30 is provided with a printer carriage 41, a head 21 mounted on the printer carriage 41, a driving mechanism 24 that moves the printer carriage 41 relatively in parallel with the medium S while maintaining a predetermined distance with respect to the medium S, and a carrying mechanism 36 that carries the medium S in a direction perpendicular to the moving direction of the printer carriage 41.

The printer carriage 41 is provided with cartridge attaching sections, to which ink cartridges (not shown) containing black (K), cyan (C), magenta (M), yellow (Y) or other color ink are attached.

The head 21 includes a nozzle row made up of a plurality of nozzles for each ink color. Each color ink supplied from the ink cartridge is ejected from the respective nozzles of the nozzle row toward a medium S to form a dot on the medium S, thereby printing an image on the medium S.

The driving mechanism 24 is provided with a timing belt 45 that is connected to the printer carriage 41, a pulley 44 engaged with the timing belt 45, a carriage motor 42 that rotationally drives the pulley 44, and a guide rail 46 that guides the movement of the printer carriage 41, a linear encoder code plate 51 as a linear encoder for detecting the position of the printer carriage 41 and a detection section 52 that detects the linear encoder code plate 51. The driving mechanism 24 drives the carriage motor 42 to rotate the timing belt 45 via the pulley 44. As a result, the printer carriage 41 relatively moves along the guide rail 46 with respect to the medium S. The carriage motor 42 is driven as controlled by control signals from the controller 50.

The carrying mechanism 36 is provided with a platen 14, a carry roller 17A, a carry motor 15 that rotationally drives the carry roller 17A, a paper detection sensor 53 that detects whether or not the medium S has reached a predetermined position, a rotary encoder 56 that detects the rotation amount of the carry roller 17A. The platen 14 is disposed facing the head 21. When the carry motor 15 is driven, the carry roller 17A rotates so that the medium S is carried on the platen 14. The carry motor 15 is driven as controlled by the control signals from the controller 50.

During printing, the medium S is carried intermittently by a predetermined carry amount by the carry roller 17A, and between the intermittent carrying operations, ink is ejected from the nozzles in the head 21 toward the medium S, while the printer carriage 41 is moving in a direction intersecting the carrying direction by the carry roller 17A, thereby printing is performed.

Operation Panel 2

Figure 5:
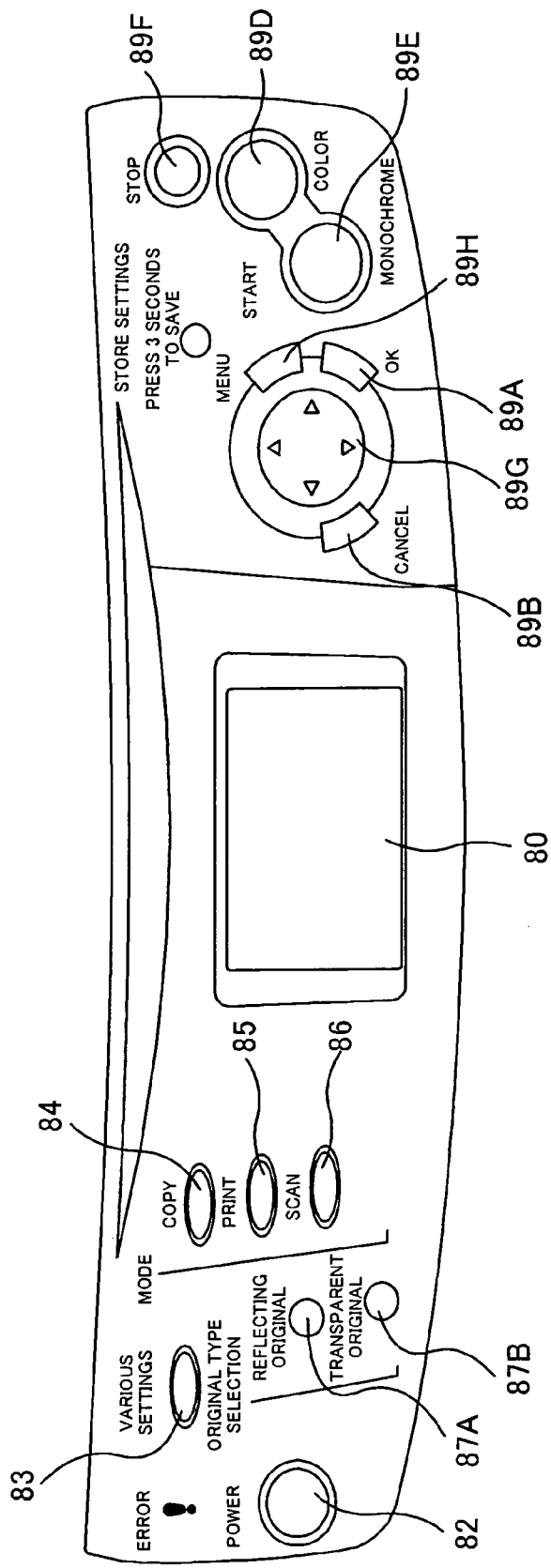
FIG. 5 is an explanatory diagram of an operation panel 2 of the multifunction apparatus 1.

FIG. 5 is an explanatory diagram of an operation panel 2 of the multifunction apparatus 1. The operation panel 2 includes a liquid crystal display 80 for displaying characters and images. To the left side of the liquid crystal display 80, a power button 82, a various settings button 83, mode buttons 84, 85, and 86, original type selection buttons 87A and 87B are provided.

The power button 82 is an on/off switch for powering on/off the multifunction apparatus 1. The various settings button 83 is a button for displaying a screen to perform various settings of the multifunction apparatus 1 on the liquid crystal display 80. The mode buttons 84, 85 and 86 are buttons for respectively setting the mode of the multifunction apparatus 1. In the present embodiment, the copy mode button 84, the print mode button 85 and the scan mode button 86 are provided. The original type selection buttons 87A and 87B are buttons for selecting the type of the original 5 from which images are read, and in the present embodiment, the reflecting original button 87A and the transparent original button 87B are provided.

To the right side of the liquid crystal display 80, an OK button 89A, a cancel button 89B, a start button (color) 89D, a start button (monochrome) 89E, a stop button 89F, a cross button 89G, and a menu button 89H are provided.

When the OK button 89A is pressed, setting conditions are set as displayed in the liquid crystal display 80. When the cancel button 89B is pressed, the setting conditions are cleared and the respective setting items are modified to the respective default values. The start button (color) 89D is a button for carrying out the process of the mode selected by one of the mode buttons 84, 85 and 86 in color, whereas the start button (monochrome) 89E is a button for carrying out the process of the mode selected by one of the mode buttons 84, 85 and 86 in monochrome. The stop button 89F is a button for stopping the process once started. In the cross button 89G, one of the four positions thereof, namely, top, bottom, left and right, can be selectively pressed. The menu button 89H switches setting items displayed on the liquid crystal display 80.

Configuration of the Controller 50

Figure 6:
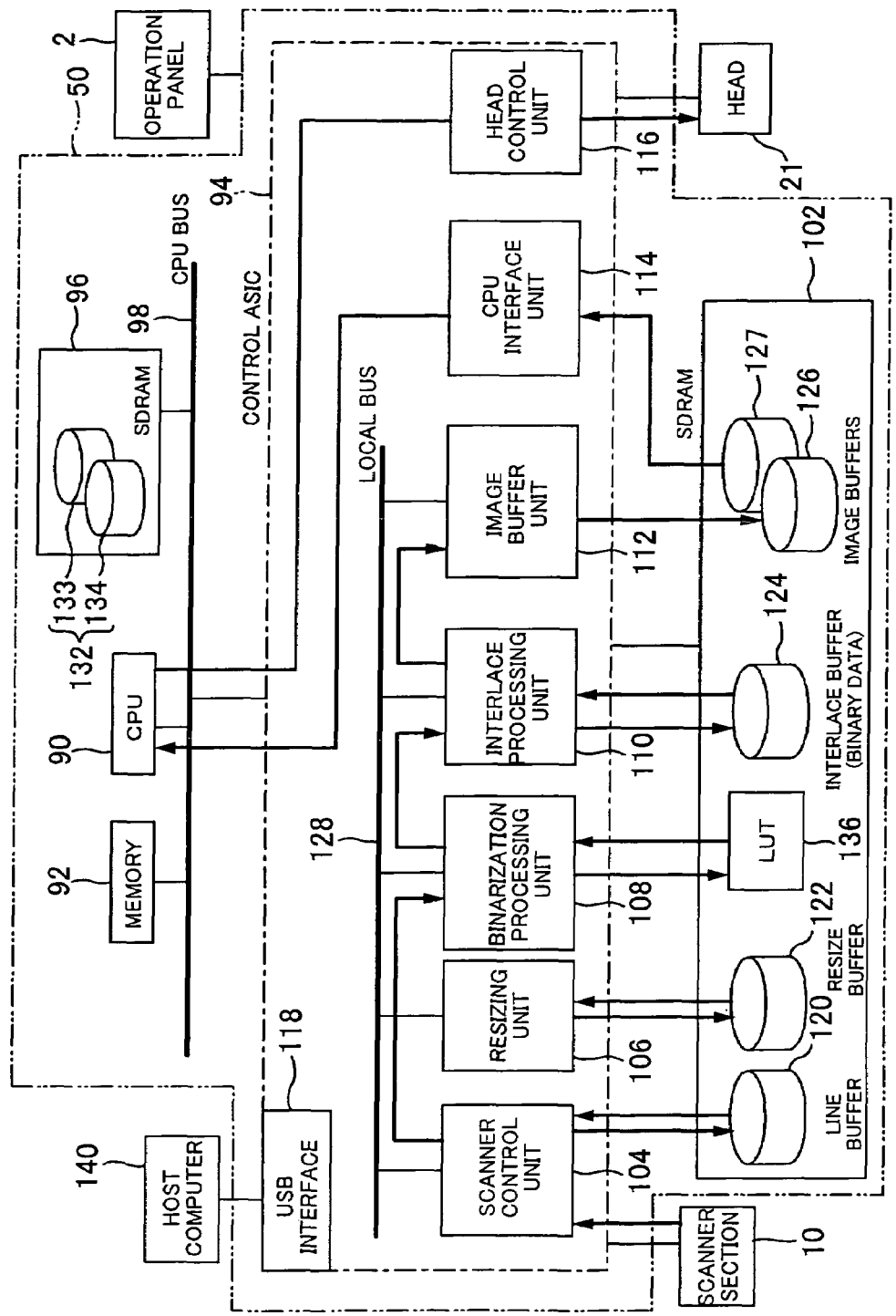
FIG. 6 is a block diagram illustrating the system configuration of a controller 50 of the multifunction apparatus 1 of the present embodiment.

FIG. 6 is a block diagram illustrating the system configuration of the controller 50 of the multifunction apparatus 1 of the present embodiment.

The controller 50 of the multifunction apparatus 1 includes a CPU 90 that performs the overall control of the multifunction apparatus 1, a memory 92 that stores control programs or the like, a control ASIC 94 that performs the respective controls of the scanner function, print function and local copy function, a SDRAM 96 in which data can be directly read and written from the CPU 90, and the operation panel 2 as input means, and all of which are connected to one another via a CPU bus 98. The control ASIC 94 is provided with a SDRAM 102 for ASIC.

The control ASIC 94 is provided with a scanner control unit 104, a resizing unit 106, a binarization processing unit 108, an interlace processing unit 110, an image buffer unit 112, a CPU interface unit 114, a head control unit 116, a USB interface 118 as input/output means with an external host computer 140, and a local bus 128.

A line buffer 120, a resize buffer 122, an interlace buffer 124, image buffers 126 and 127 are provided allocated in the SDRAM 102 for ASIC.

The scanner control unit 104 controls the light sources 66A and 66B, the image sensors 72A and 72B, the driving motor 77 of the scanner carriage 60 and the like of the scanner section 10. The scanner control unit 104 sends out image data read via the image sensors 72A and 72B.

The resizing unit 106 receives image data in a predetermined size, changes the size of the image data, and sends out the image data whose size has been changed. The binarization processing unit 108 converts RGB data in multiple gradations that is sent out to CMYK binary data (or 2-bit data), and send the resultant data out to the interlace processing unit 110.

The interlace processing unit 110 stores the CMYK binary data (or 2-bit data) sent from the binarization processing unit in the interlace buffer 124 of the SDRAM 102 for ASIC. Then, the interlace processing unit 110 reads out the CMYK binary data (or 2-bit data) stored in the interlace buffer 124 in a unit of a predetermined size, rearranges the data so as to correspond to the nozzle arrangement, and sends the resultant data out to the image buffer unit 112.

In the image buffer unit 112, based on the data sent out from the interlace processing unit 110, head driving data for causing the nozzles to eject ink during every movement of the printer carriage 41 is generated. Here, the image buffer unit 112 stores the head driving data in the image buffers 126 and 127 provided on the SDRAM 102. In the image buffers 126 and 127, respectively, the head driving data for every single movement of the printer carriage 41 is stored.

The CPU interface unit 114 enables the access from the CPU 90 to the SDRAM 102 for ASIC that is connected to the control ASIC 94. In the present embodiment, the head driving data generated by the image buffer unit 112 is sent out from the image buffers 126 and 127 to the head control unit 116 via the CPU interface unit 114.

The head control unit 116 drives the head 21 based on the head driving data sent from the CPU 90 to cause the nozzles of the head 21 to eject ink.

Data Flow in the Controller 50

Regarding During the Scanner Function

Image reading command signal by the scanner section 10 and reading information data such as a reading resolution and a reading region are transmitted from the host computer 140 that is connected to the USB interface 118 of the control ASIC 94 to the controller 50. The controller 50 controls the scanner control unit 104 based on the image reading command signal and the reading information data, and the scanner section 10 starts reading the original 5. At this time, the scanner control unit 104 drives the light sources 66A and 66B, the image sensors 72A and 72B and the driving mechanism 62 to sequentially read the original 5 as image data from the image sensors 72A and 72B, and temporarily stores such image data in the line buffer 120 of the SDRAM 102 for ASIC. Then, the scanner control unit 104 performs a process for correction between lines or the like to the image data stored in the line buffer 120, and outputs the resultant data to the host computer 140 via the USB interface 118.

Regarding During the Printer Function

During the printer function, a printer driver of the host computer 140 converts image data to head driving data, and the head driving data is input from the USB interface 118. The head driving data is stored in an image buffer 132 allocated in the SDRAM 96 that is connected to the CPU bus 98. The image buffer 132 includes two separate memory areas (image buffers 133 and 134). Each of the image buffers 133 and 134 has a capacity enough to store the head driving data to perform printing during a single movement of the printer carriage 41. When the data for a single movement of the printer carriage 41 is written in the image buffer 133, one of the two buffers, the data is transferred to the head control unit 116. At this time, when the head driving data in one of the image buffers, namely, the image buffer 133, is transferred to the head control unit 116, head driving data for performing printing during the subsequent movement is stored in the other image buffer 134. Then, if the data for a single movement is written in the other image buffer 134, the data is transferred to the head control unit 116, and image data is written in the one of the image buffers, that is the image buffer 133. In this way, two image buffers 133 and 134 are used to alternately carry out writing and reading of the head driving data, and the head 21 is driven by the head control unit 116 to perform printing.

Regarding During the Copy Function

Next, the flow of data during the copy function is described. Data read by the scanner section 10 is taken in by the line buffer 120 via the scanner control unit 104. The image data taken in by the line buffer 120 is subjected to the process for correction between lines in sequence, and sent out to the binarization processing unit 108 from the scanner control unit 104.

The image data sent into the binarization processing unit 108 is subjected to color conversion from RGB data to CMYK data based on a look-up table 136 that is stored in the SDRAM 102 for ASIC. The resultant CMYK data is converted into binary data for each color of CMYK through the halftone process, and sent to the interlace processing unit 110.

The CMYK binary data that is sent into the interlace processing unit 110 is stored in the interlace buffer 124 in the SDRAM 102 for ASIC and rearranged so as to correspond to the nozzle arrangement by the interlace processing unit 110. Then, the data rearranged by the interlace processing unit 110 is sent to the image buffer unit 112.

In the image buffer unit 112, the data sent from the interlace processing unit 110 is arranged so as to form the head driving data for causing the nozzles to eject ink during each movement of the printer carriage 41, and the resultant data is stored in the image buffers 126 and 127.

The head driving data for each movement stored in the image buffers 126 and 127 is read by the CPU 90 via the CPU interface unit 114 and transferred to the head control unit 116. The head control unit 116 performs printing by driving the head 21 based on the head driving data transferred.

Regarding Reading of Images from the original 5

Reading of Images from the Reflecting Original 5A

When reading an image from the reflecting original 5A, as shown in FIG. 2, the original table cover 12 is first opened, the original 5A is placed on the placement surface 11a of the original table 11, and the original table cover 12 is closed. Then, by pressing the start button (color) 89D and the like after operating the scan mode button 86 and the like on the operation panel 2, the image reading operation is started.

Figure 7:
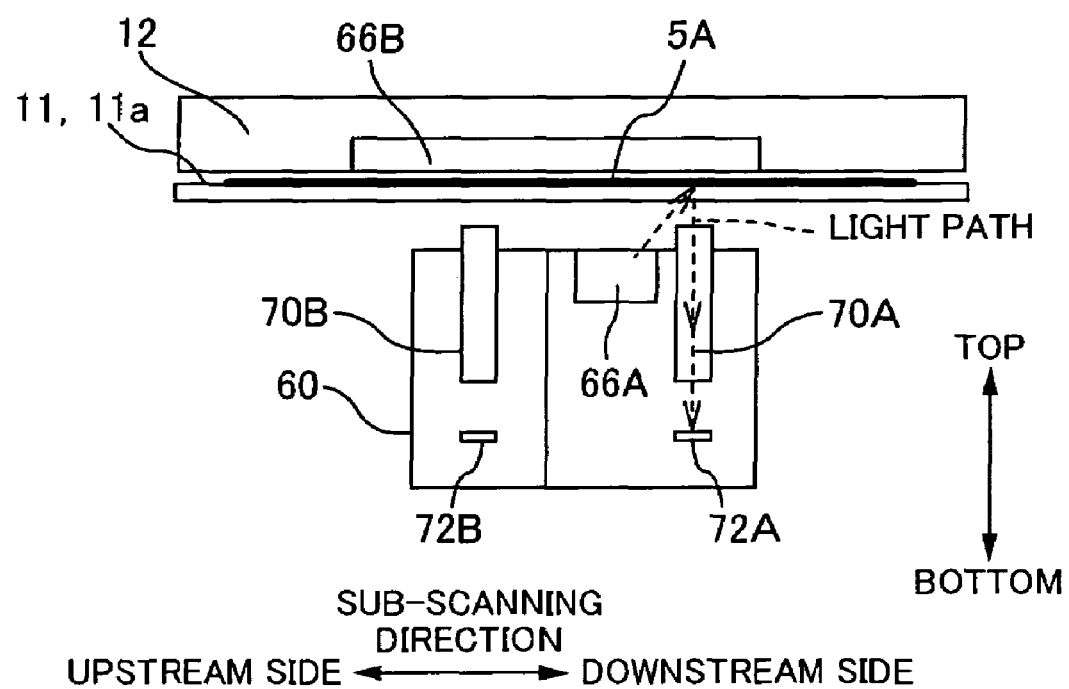
FIG. 7 is an explanatory diagram of an image reading operation from a reflecting original 5A.

FIG. 7 is an explanatory diagram of the image reading operation from the reflecting original 5A. When reading an image, the scanner carriage 60 moves at a predetermined speed downstream in the sub-scanning direction. During this movement, light is emitted in order from the LED light source 66A in three colors of the scanner carriage 60, and this light enters the image sensor 72A via the lens 70A of the scanner carriage 60 after it is reflected by the reflecting original 5A on the placement surface 11a. The image sensor 72A receives this incident light to read an image from the reflecting original 5A on the placement surface 11a.

Reading of Images from the Transparent original 5B

Figure 8:
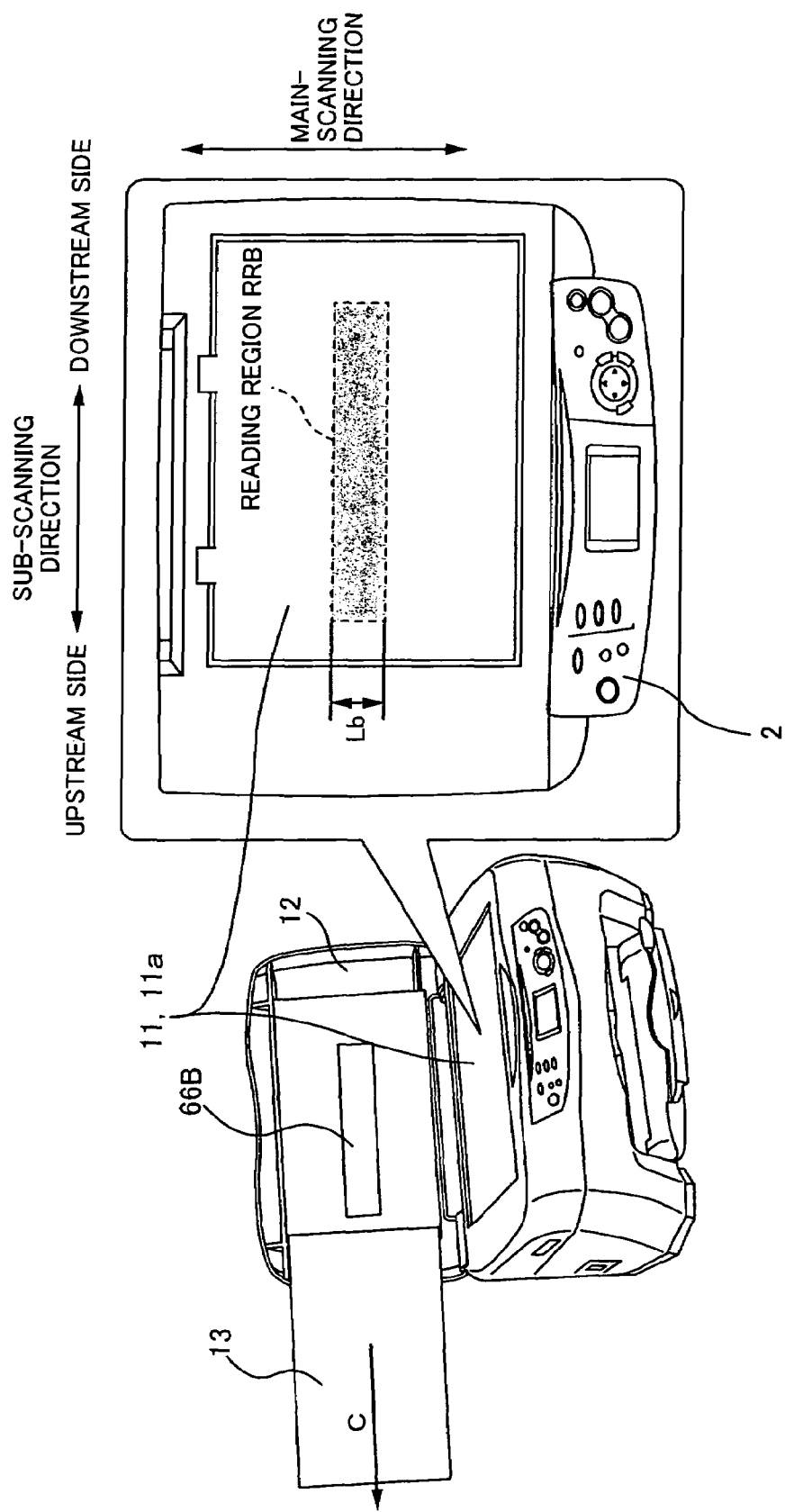
FIG. 8 is an explanatory diagram of image reading from a transparent original 5B.

When reading an image from the transparent original 5B, as shown in FIG. 8, a reflecting plate 13 that is attached to the back surface of the original table cover 12 is slid along the arrow C of FIG. 8 to be removed from the original table cover 12. Then, the transparent original light source 66B that is housed in the back surface of the original table cover 12 is exposed and put in a usable state.

Figure 9:
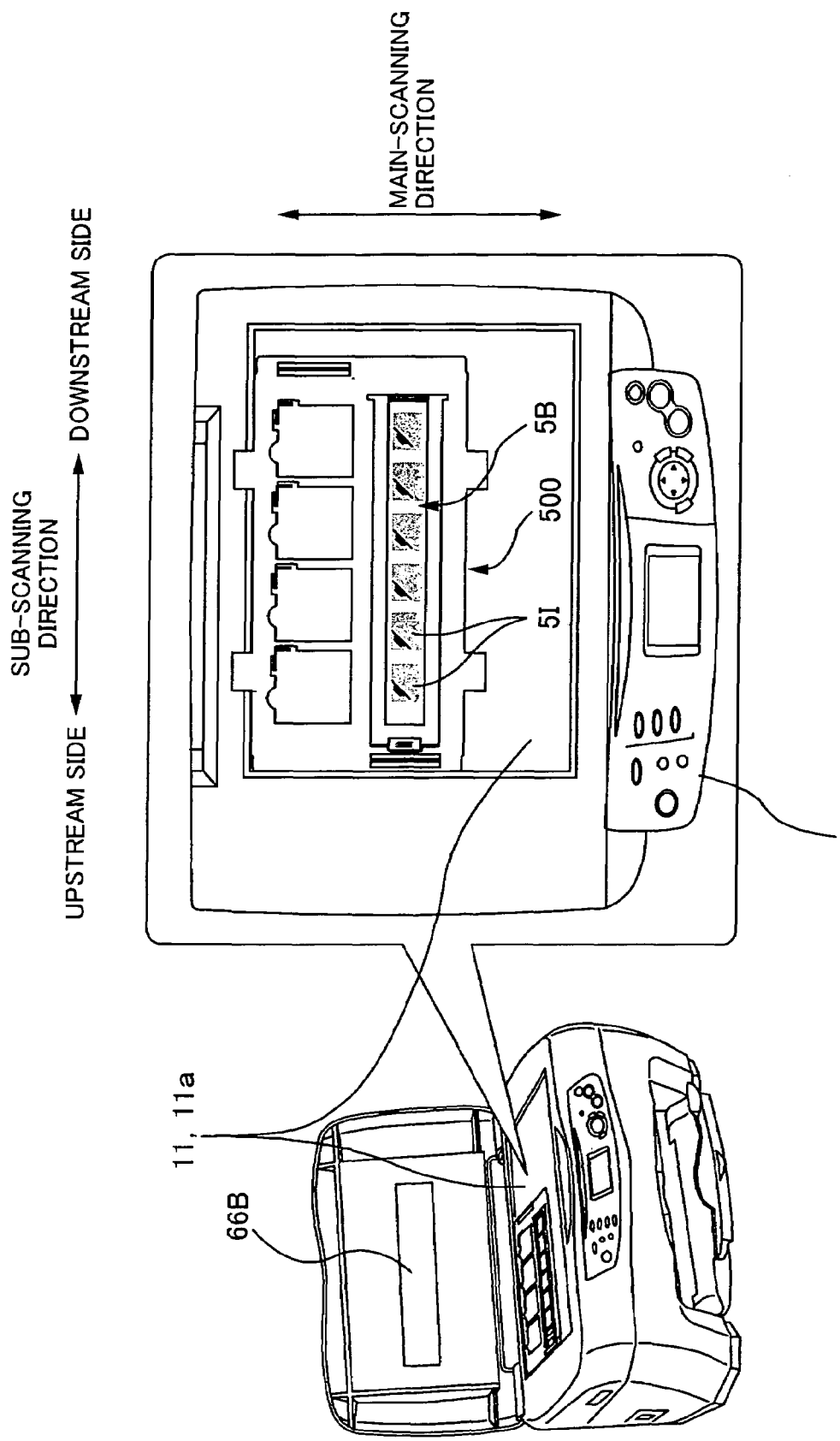

Next, the transparent original 5B is placed on the placement surface 11a of the original table 11. At this time, in order to correctly position the transparent original 5B in a reading region (region where images can be read by the image sensor 72B) RRB that is set on the placement surface 11a as shown in FIG. 8, the transparent original 5B is held by a transparent original holder 500 for exclusive use as shown in FIG. 9, and placed on the placement surface 11a as held by the transparent original holder 500. It should be noted that the reading region RRB is set in correspondence to the above-described width Lb in the main-scanning direction of the image sensor 72B, with the width Lb in the central portion of the placement surface 11a.

After closing the original table cover 12, when the scan mode button 86 and the like of the operation panel 2 are operated and the start button (color) 89D is pressed, the image reading operation is started.

Figure 10:
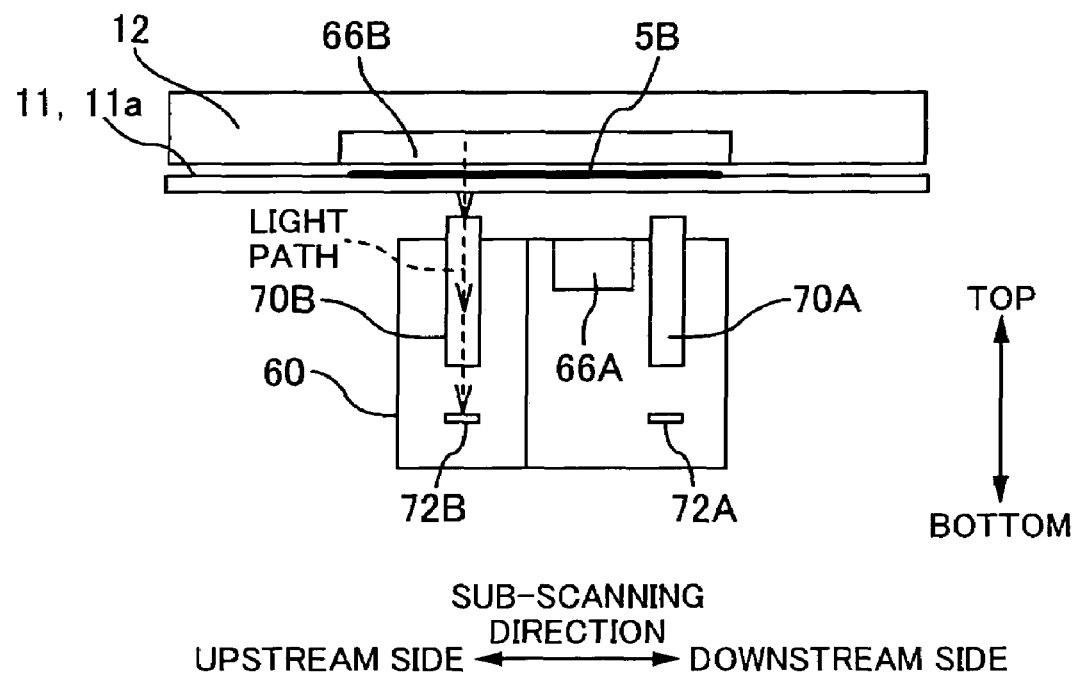
FIG. 10 is an explanatory diagram of an image reading operation from the transparent original 5B.

FIG. 10 is an explanatory diagram of the image reading operation from the transparent original 5B. When the original table cover 12 is closed, as shown in FIG. 10, the transparent original light source 66B of the original table cover 12 is opposed to the transparent original 5B on the placement surface 11a. When reading an image, the scanner carriage 60 moves at a predetermined speed downstream in the sub-scanning direction. During this movement, light is emitted from the transparent original light source 66B. The light is transmitted through the transparent original 5B on the placement surface 11a downward, and enters the image sensor 72B via the lens 70B of the scanner carriage 60. Then, the image sensor 72B receives this incident light to read an image from the transparent original 5B placed on the placement surface 11a.

Transparent original Holder 500

Figure 11A:
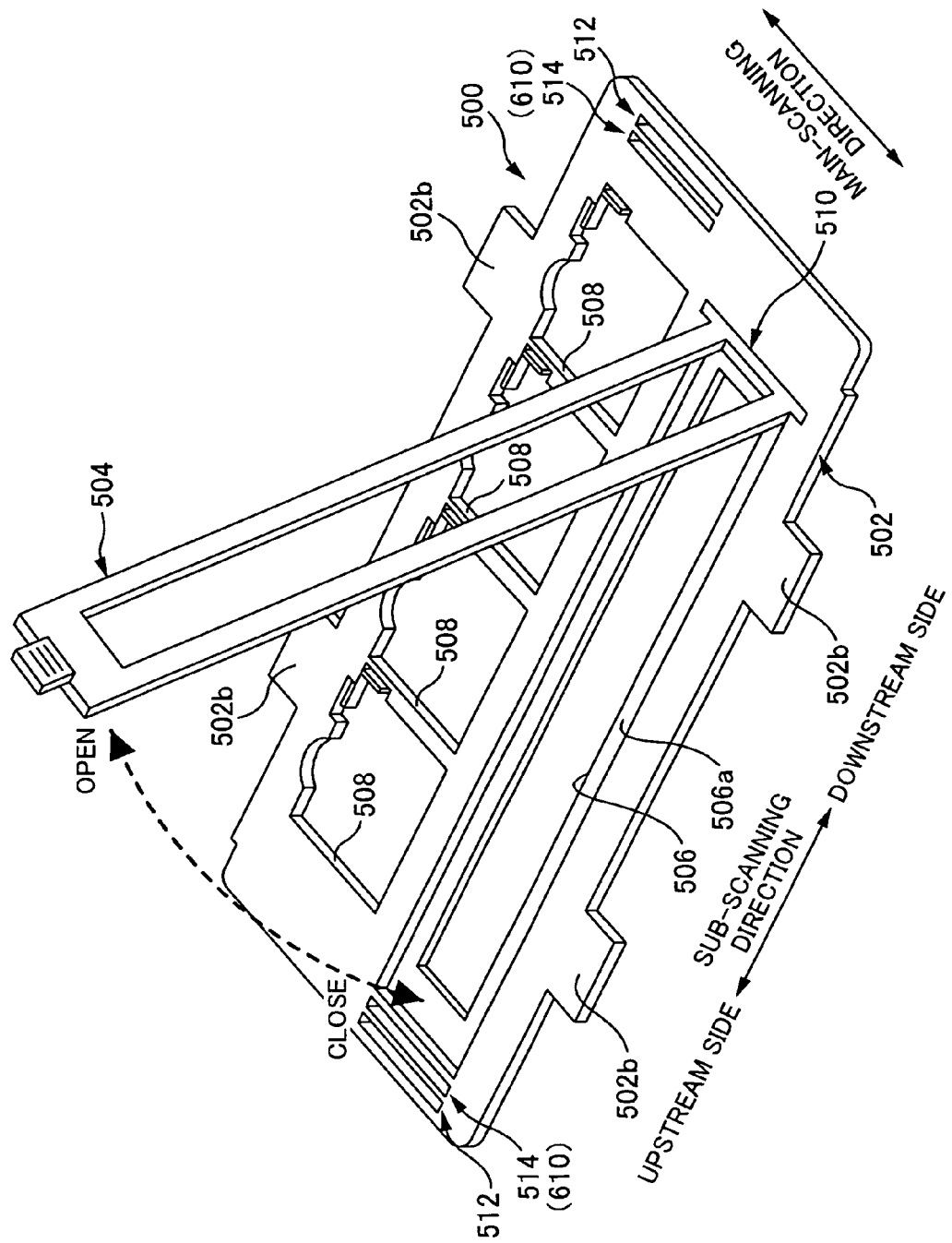
FIG. 11A is a perspective view of a transparent original holder 500.
Figure 11B:
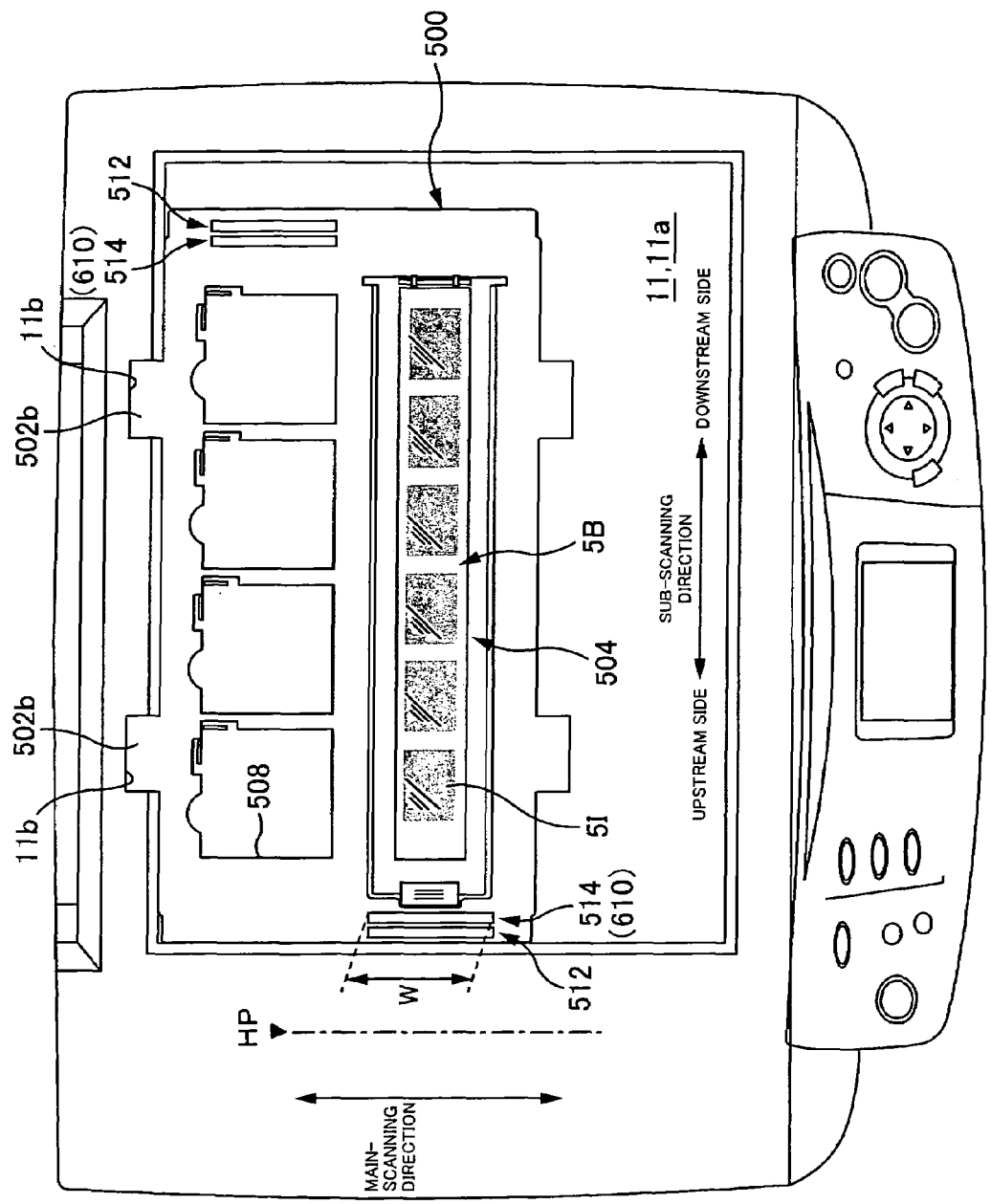
FIG. 11B is a top view of the transparent original holder 500.

FIGS. 11A and 11B are explanatory diagrams of the transparent original holder 500. FIG. 11A is a perspective view of the transparent original holder 500. FIG. 11B is a top view of the transparent original holder 500, which illustrates a state in which the transparent original holder 500 is placed on the placement surface 11a of the original table 11.

As shown in FIG. 11B, the transparent original holder 500 is for holding the transparent original 5B such as 35 mm photographic films or slides (not shown), and accurately positioning the held transparent original 5B in the reading region RRB on the placement surface 11a.

As shown in FIG. 11A, the transparent original holder 500 includes a base plate 502 (corresponding to the original holder body) made up of a plate material whose external shape is substantially a rectangle elongated in the sub-scanning direction when placed on the placement surface 11a, and a cover plate 504 for holding the photographic film 5B by sandwiching the photographic film 5B between the base plate 502 and the cover plate 504.

In the base plate 502, a rectangular opening elongated in the sub-scanning direction (hereinafter referred to as the "photographic film opening") 506 is formed as a film mount for holding the photographic film 5B. At the portion next to the photographic film opening 506 in the main-scanning direction, a plurality of rectangular openings (hereinafter referred to as the "slide openings") 508 are formed as slide mounts for holding slides.

The cover plate 504 is a frame body whose external shape is substantially rectangular of a size a little larger than the photographic film opening 506, and can be opened and closed with respect to the film opening 506 by a hinge section 510 that is provided at one end in the sub-scanning direction of the photographic film opening 506.

Then, if the cover plate 504 is closed in a state in which the rim of the photographic film 5B is placed on the periphery portion 506a of the photographic film opening 506, the photographic film 5B is held sandwiched between the cover plate 504 and the periphery portion 506a. It should be noted that this cover plate 504 is the above-described frame body and as shown in FIG. 11B, openings are formed in the portions corresponding to the image 5I of the photographic film 5B. Therefore, in the holding state, the light from the transparent original light source 66B can be transmitted through the photographic film 5B without blocking the light by the cover plate 504.

On the other hand, slides are held by fitting the same to the slide opening 508.

When placing the transparent original holder 500 on the placement surface 11a of the original table 11, as shown in FIG. 11B, the convex portion (corresponding to an engagement section) 502b formed in the base plate 502 is engaged with a concave portion (corresponding to an engagement section) 11b formed in the periphery portion of the placement surface 11a. In this way, the transparent original 5B is positioned in the reading region RRB.

However, as shown in FIG. 8, the reading region RRB is located in the central portion in the main-scanning direction and set with a width Lb limited in the sub-scanning direction, and it is not large enough to read the photographic film 5B and slides at the same time, but in a size in which only one of the photographic film 5B and slides can be read. Therefore, when reading an image of slides, the right and left sides of the transparent original holder 500 are inverted compared with the state for reading the photographic film 5B shown in FIG. 11B, and placed on the placement surface 11a.

Incidentally, in a state in which the transparent original holder 500 is placed on the placement surface 11a as shown in FIG. 11B, at the portion shifted to a standby position HP of the scanner carriage 60 from the transparent original 5B held on the base plate 502, two rectangular slits 512 and 514 that vertically penetrate the base plate 502 are provided arranged next to each other in the sub-scanning direction.

The slit 512 that is closer to the standby position HP is used in the "lighting-up and warming-up step of the transparent original light source 66B (S350)" (see FIG. 24) that is carried out during the image reading operation from the transparent original 5B. Specifically, the slit 512 is a lighting checking slit 512 that, when the transparent original light source 66B is lighted up, guides the light to the image sensor 72B so that the image sensor 72B checks the lighting state of the light source 66B (see FIGS. 24 and 25B)

The other slit 514 is used in the "detecting step of photodiodes subject to the linearity defect (S370)" that is also carried out during the reading operation. Specifically, the slit 514 is for guiding the light of the transparent original light source 66B to the image sensor 72B so as to determine whether or not each photodiode of the image sensor 72B is subject to the linearity defect based on the output value that each of the photodiodes outputs after receiving the light (see FIGS. 24 and 25C).

It should be noted that the entire surface of the slit 514 is covered with a film body (hereinafter also referred to as the "linearity defect detection film body") 610 with 1% to 5% transmittance for the purpose of improving the detection sensitivity of the linearity defect (to be described below in detail). Therefore, in detecting the linearity defect, the light amount of the transparent original light source 66B is reduced to 1% to 5% by the film body 610 before the light enters the image sensor 72B.

In addition, the width W in the main-scanning direction of the slit 514 is set to a length that exceeds the image 5I of the photographic film. Therefore, once the transparent original holder 500 is placed on the placement surface 11a, it is possible to determine the linearity defect with respect to all the photodiodes included in the image sensor 72B that are used in the reading operation of the image 5I that is performed immediately after the placement, without changing the placement position.

These slits 512 and 514 are provided corresponding to the type of the transparent original 5B. In the transparent original holder 500 of this example, since a slide (not shown) is also held as the transparent original 5B, the slits 512 and 514 are provided next to the slide opening 508 in the sub-scanning direction as well. When an image is read from a slide, the transparent original holder 500 is horizontally inverted from the state in FIG. 11B. In the state after the horizontal inversion, as shown in FIG. 11C, these slits 512 and 514 are located in a position closer to the standby position HP than the position of the slide (not shown).

Scanner Control Unit 104

Figure 12:
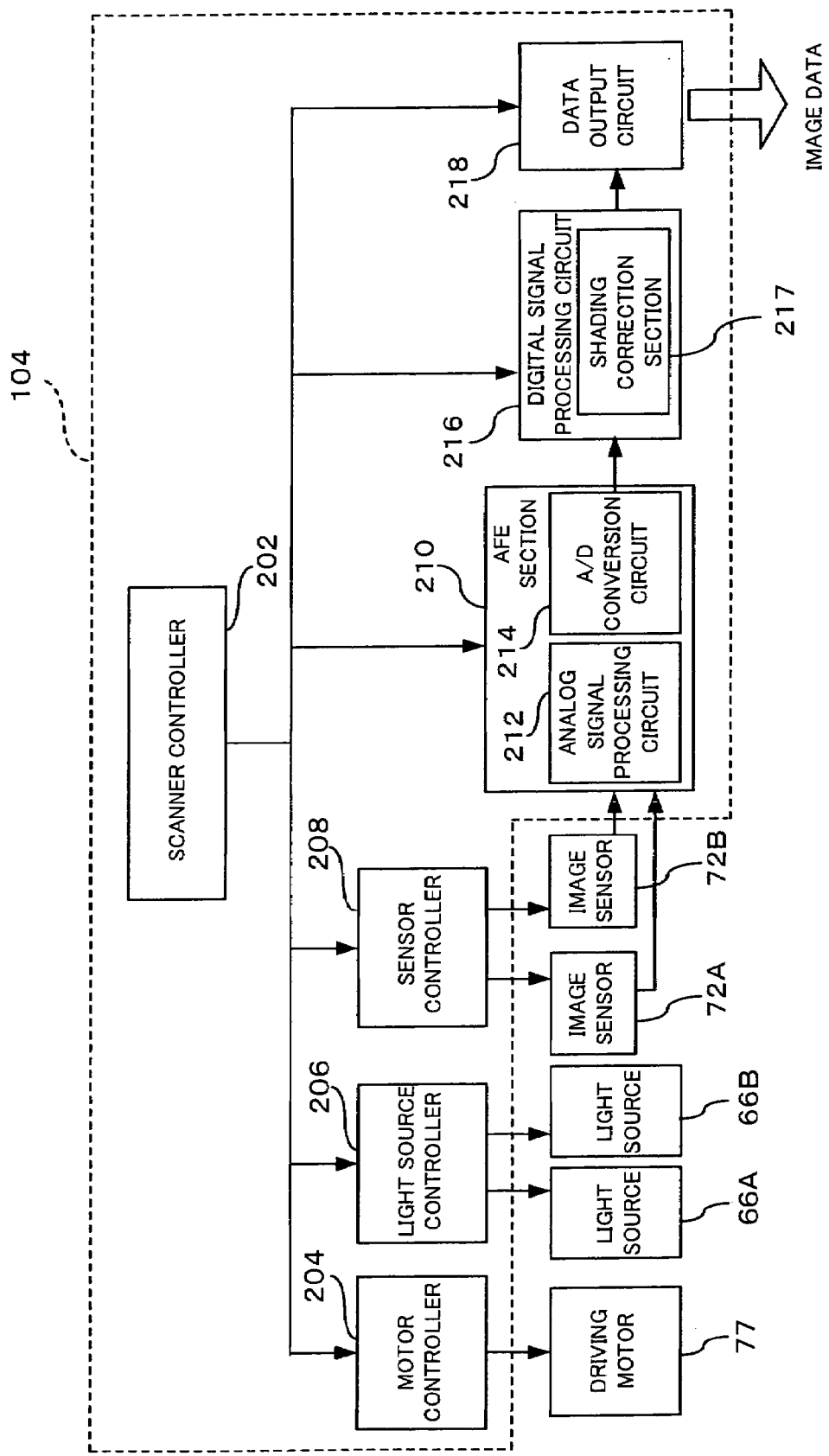
FIG. 12 is an explanatory diagram of the configuration of a scanner control unit 104.

FIG. 12 is an explanatory diagram of the configuration of the scanner control unit 104. The scanner control unit (corresponding to the read data generating section) 104 is provided with, as shown in FIG. 12, a scanner controller 202, a motor controller 204, a light source controller 206, a sensor controller 208, and an AFE (Analog Front End) section 210, a digital signal processing circuit 216, a data output circuit 218. Further, the AFE section 210 is provided with an analog signal processing circuit 212 and an A/D conversion circuit 214.

The scanner controller 202 controls the motor controller 204, the light source controller 206, the sensor controller 208, the AFE section 210, the digital signal processing circuit 216, and the data output circuit 218 based on commands from the CPU 90 and the like (see FIG. 6). The motor controller 204 controls driving of the driving motor 77 for moving the scanner carriage 60 based on commands from the scanner controller 202. The light source controller 206 controls the light emission of the reflecting original light source 66A or the transparent original light source 66B. The sensor controller 208 controls the image sensor 72A or the image sensor 72B.

The analog signal processing circuit 212 of the AFE section 210 carries out signal processing with respect to analog voltage signals of an image read by the image sensors 72A and 72B. In addition, the A/D conversion circuit 214 of the AFE section 210 performs A/D conversion from the analog voltage signals subjected to the signal processing by the analog signal processing circuit 212 to digital data.

The digital signal processing circuit 216 carries out digital signal processing with respect to the digital data sent from the A/D conversion circuit 214 of the AFE section 210, and includes, for example, a shading correction section 217 and the like.

Figure 24:
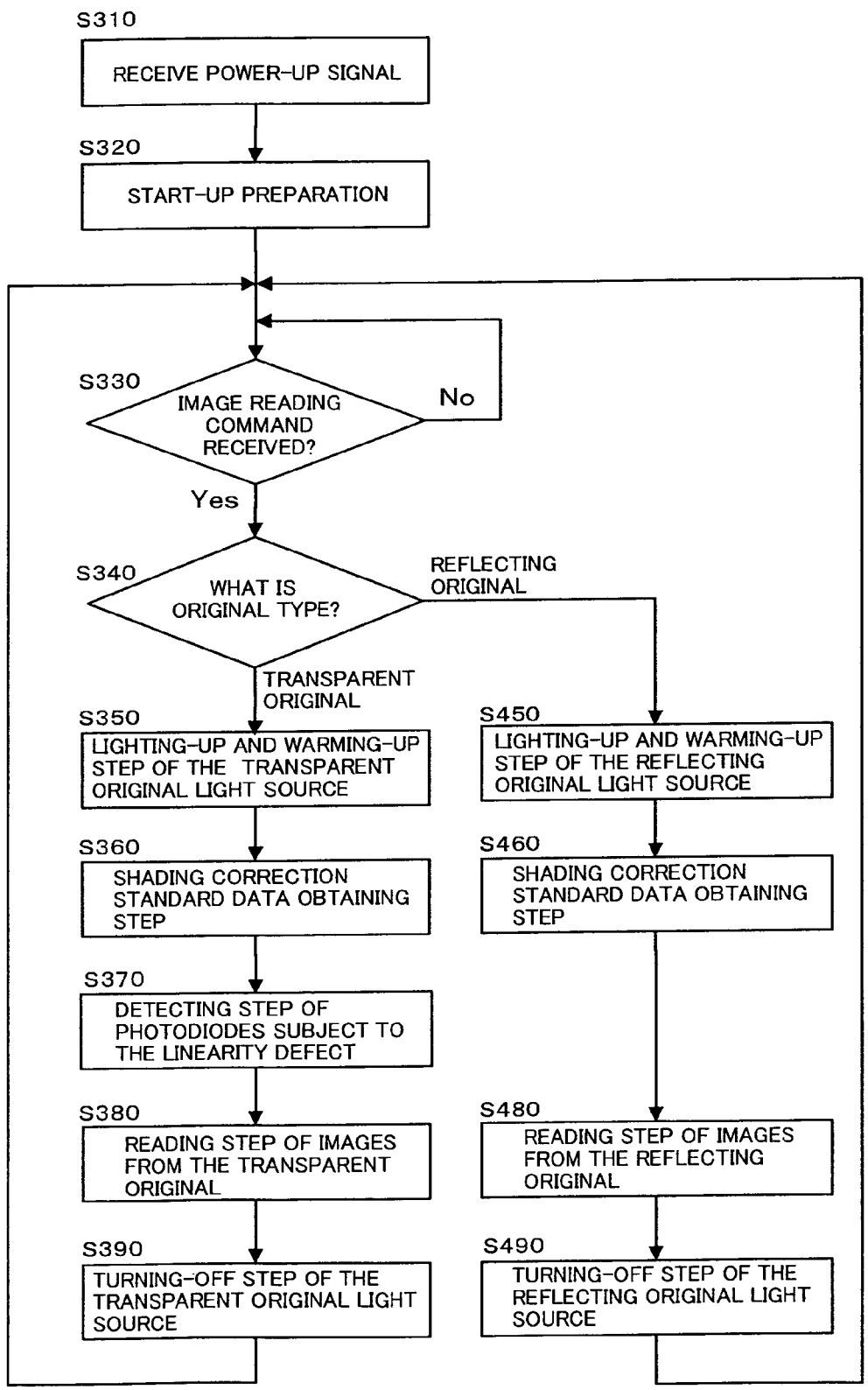
FIG. 24 is a flow chart from power-up to the reading operation of the multifunction apparatus 1 of the present embodiment.

The shading correction section 217 corrects variance in the outputs from the photodiodes of the image sensors 72A and 72B, that is, corrects the digital data based on the white standard data and the black standard data obtained for each photodiode, in the "shading correction standard data obtaining step" carried out during the image reading operation (see FIG. 24). More specifically, the digital data input to the shading correction section 217 is subjected to subtraction correction only for the black standard data, and the digital data after the subtraction correction is subjected to the multiplication correction with a gain value obtained based on the white standard data and black standard data. It should be noted that the white standard data refers to the digital data after the A/D conversion obtained by reading a predetermined white standard, whereas the black standard data refers to the digital data after the A/D conversion obtained by reading a predetermined black standard.

The digital data output from the shading correction section 217 is, through other processing sections of the digital signal processing circuit 216, converted into gradation value data (corresponding to the read data) made up of 256 gradation values for example, and output to the outside by the data output circuit 218 as image data read from the original 5. Here, the image data output from the data output circuit 218 is output to the host computer 140 via the USB interface 118, or sent to the resizing unit 106 (see FIG. 6).

Figure 13A:
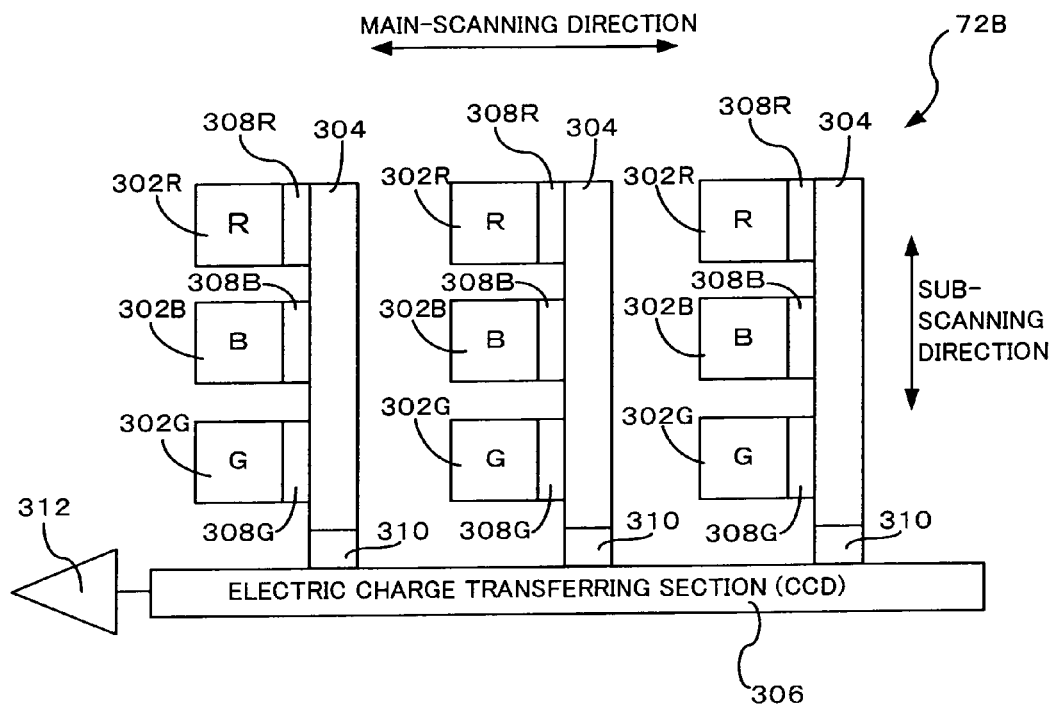
FIG. 13A and FIG. 13B are respectively explanatory diagrams of photoelectric conversion elements provided in an image sensor 72A and an image sensor 72B.
Figure 13B:
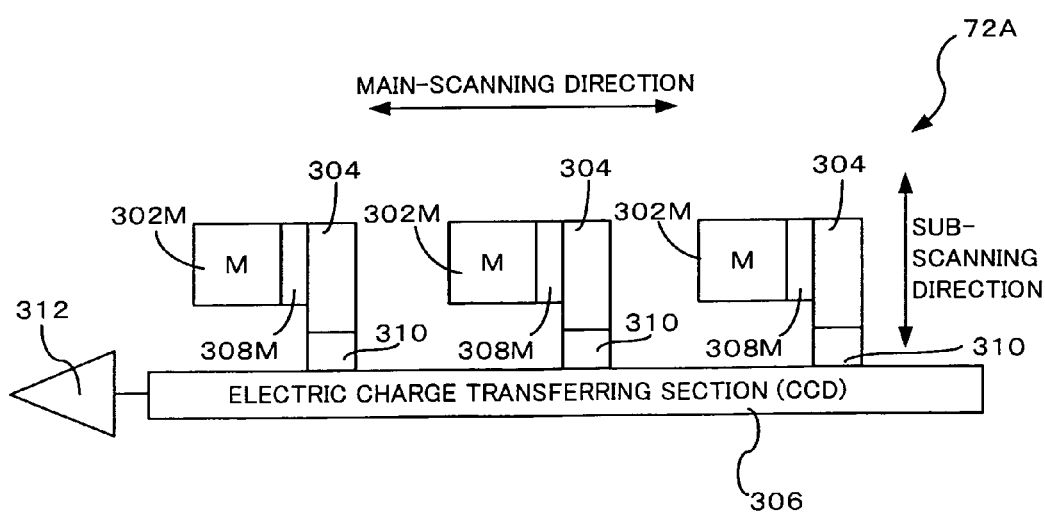

Regarding Light-receiving Conversion Element of the Image Sensor 72A and Image Sensor 72B FIG. 13A and FIG. 13B are, respectively, explanatory diagrams of photoelectric conversion elements provided in the image sensor 72A and the image sensor 72B. Here, the image sensor 72B whose configuration is complicated is described first, and then the image sensor 72A is described.

Light-receiving Conversion Element of the Image Sensor 72B for the Transparent original (1) Description of Outline As described above, since the transparent original light source 66B emits white light, the light that has been transmitted through the transparent original 5B are separated into the respective RGB color components at the side of the image sensor 72B. For this reason, the image sensor 72B includes as the photoelectric conversion element, as shown in FIG. 13A, photodiodes in three colors, photodiodes 302R, 302B and 302G. In other words, a photodiode 302R for receiving red (R) light, a photodiode 302B for receiving blue (B) light, and a photodiode 302G for receiving green (G) light are included.

These photodiodes 302R, 302B and 302G in three colors are arranged in a row along the sub-scanning direction. These photodiodes 302R, 302B and 302G in three colors arranged in a row are grouped as one group, and the RGB gradation value data that corresponds to one pixel, that is the minimum unit of an image, is generated based on the unit of this group. A plurality of the groups of the photodiodes 302R, 302B and 302G in the three colors are arranged in a row along the main-scanning direction that is the longitudinal direction of the image sensor 72B, thereby constituting the image sensor 72B.

This image sensor 72B is provided with a register 304 for taking out electric charges that are generated at the photodiodes 302R, 302B and 302G in the three colors, and an electric charge transferring section (CCD: charge-coupled device) 306. The register 304 is provided in each group so as to transfer the electric charges that are generated at the photodiodes 302R, 302B and 302G in three colors to the electric charge transferring section 306, and used commonly by the photodiodes 302R, 302B and 302G in three colors that belong to the same group.

The first gates 308R, 308B and 308G are provided between the respective photodiodes 302R, 302B and 302G and the register 304. When taking out electric charges from the respective photodiodes 302R, 302B and 302G, the corresponding first gates 308R, 308B and 308G are opened. Also, between the register 304 and the electric charge transferring section 306, a second gate 310 is provided. When the electric charge is transferred from the register 304 to the electric charge transferring section 306, the second gate 310 is opened.

The electric charges that are generated at the photodiodes 302R, 302B and 302G in three colors are transferred to the electric charge transferring section 306 through this common register 304. The electric charge transferring section 306 temporarily accumulates electric charges that have been transferred from the photodiodes 302R, 302B and 302G in three colors through the register 304. The electric charge transferring section 306 sequentially transfers the electric charges temporarily accumulated to a detection section 312. The detection section 312 sequentially detects the amount of electric charges transferred by the electric charge transferring section 306. Then, the detection section 312 outputs analog voltage signals corresponding to the detected amount of electric charges to the AFE section 210 of the scanner control unit 104 (see FIG. 12).

(2) Transfer Order Of Electric Charges

Figure 14A:
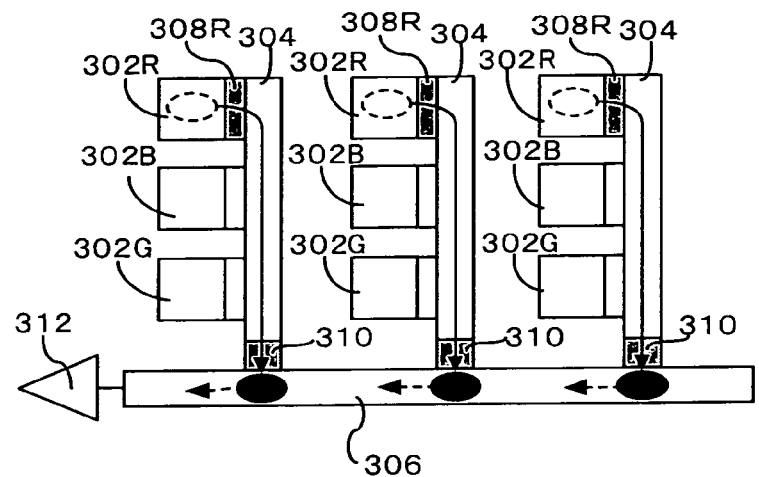
FIG. 14A is a diagram illustrating how electric charges generated at red (R) photodiodes 302R are transferred.
Figure 14B:
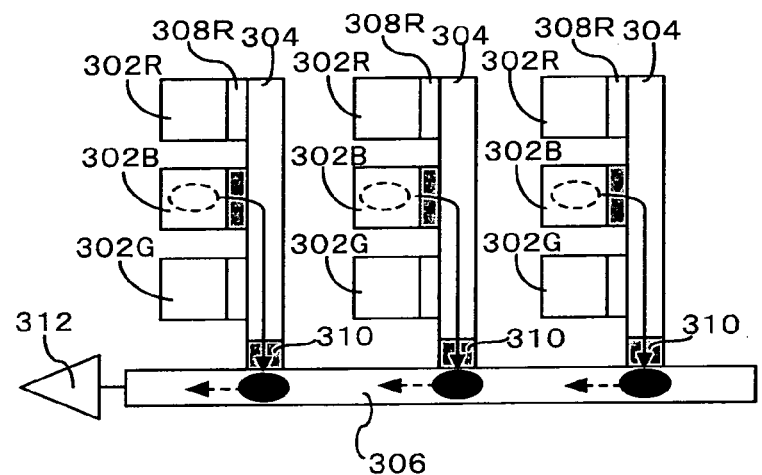
FIGS. 14B and 14C are diagrams respectively illustrating how electric charges generated at blue (B) photodiodes 302B and green (G) photodiodes 302G are transferred.
Figure 14C:
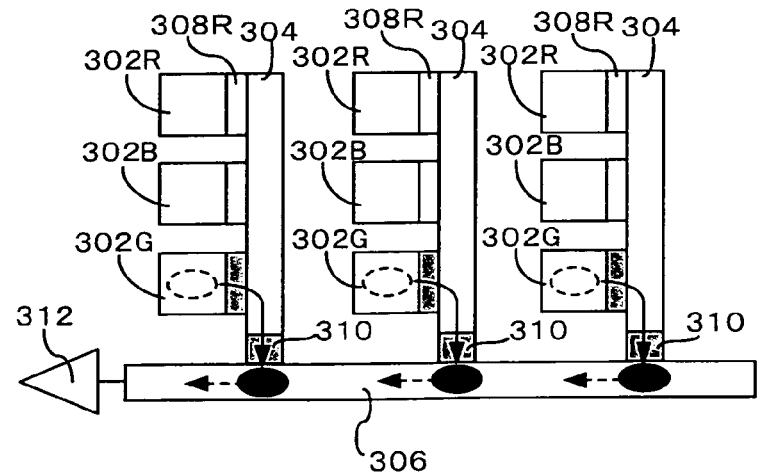

FIGS. 14A through 14C are explanatory diagrams of the transfer order of the electric charges generated in the photodiodes 302R, 302B and 302G in red(R), blue(B) and green (G). FIG. 14A illustrates how electric charges generated at red(R) photodiodes 302R are transferred. FIGS. 14B and 14C respectively illustrate how electric charges generated at blue (B) photodiodes 302B and green(G) photodiodes 302G are transferred.

Here, as shown in FIG. 14A, the electric charge generated at the red(R) photodiode 302R is transferred to the electric charge transferring section 306. In order to transfer the electric charge generated at the red(R) photodiode 302R to the electric charge transferring section 306, the first gate 308R that corresponds to the red(R) photodiode 302R and the second gate 310 are opened (gray portion in FIG. 14A). At this time, the first gates 308B and 308G that correspond to the blue(B) photodiode 302B and the green(G) photodiode 302G are closed. Accordingly, the electric charge generated at the red(R) photodiode 302R is transferred to the electric charge transferring section 306.

Next, as shown in FIG. 14B, the electric charge generated at the blue (B) photodiode 302B is transferred to the electric charge transferring section 306. In order to transfer the electric charge generated at the blue(B) photodiode 302B to the electric charge transferring section 306, the first gate 308B that corresponds to the blue (B) photodiode 302B and the second gate 310 are opened (gray portion in FIG. 14B). It should be noted that the first gates 308R and 308G that correspond to the red(R) photodiode 302R and the green(G) photodiode 302G are closed. In this way, by opening the first gate 308B and the second gate 310, the electric charge generated at the blue(B) photodiode 302B is transferred to the electric charge transferring section 306.

Lastly, as shown in FIG. 14C, the electric charge generated at the green(G) photodiode 302G is transferred to the electric charge transferring section 306. In order to transfer the electric charge generated in the green(G) photodiode 302G to the electric charge transferring section 306, the first gate 308G that corresponds to the green (G) photodiode 302G and the second gate 310 are opened (gray portion in FIG. 14C). It should be noted that at this time, the first gates 308R and 308B that correspond to the red (R) photodiode 302R and the blue (B) photodiode 302B are closed. In this way, by opening the first gate 308G and the second gate 310, the electric charge generated at the green(G) photodiode 302G is transferred to the electric charge transferring section 306.

(3) Method For Transferring Electric Charges

Next, the method for transferring electric charges generated at the photodiodes 302R, 302B and 302G to the electric charge transferring section 306 is described. An example in which an electric charge generated at the red(R) photodiode 302R is transferred to the electric charge transferring section 306 is described.

Figure 15A:
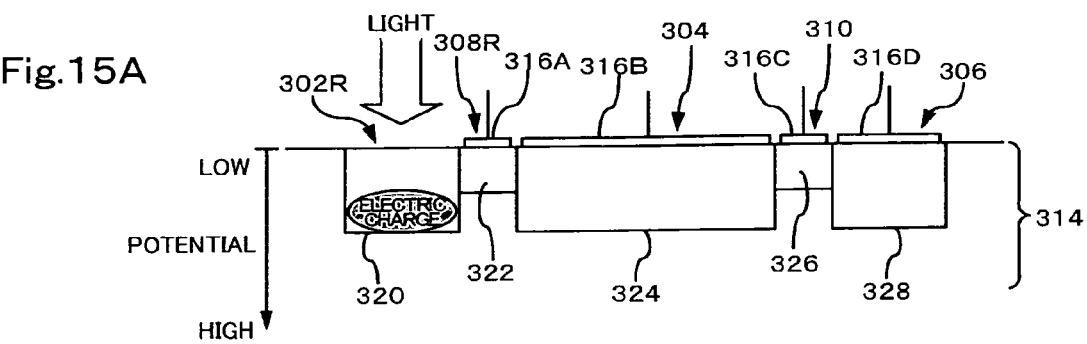
FIG. 15A is a diagram illustrating a state in which an electric charge is generated at the photodiode 302R.
Figure 15B:
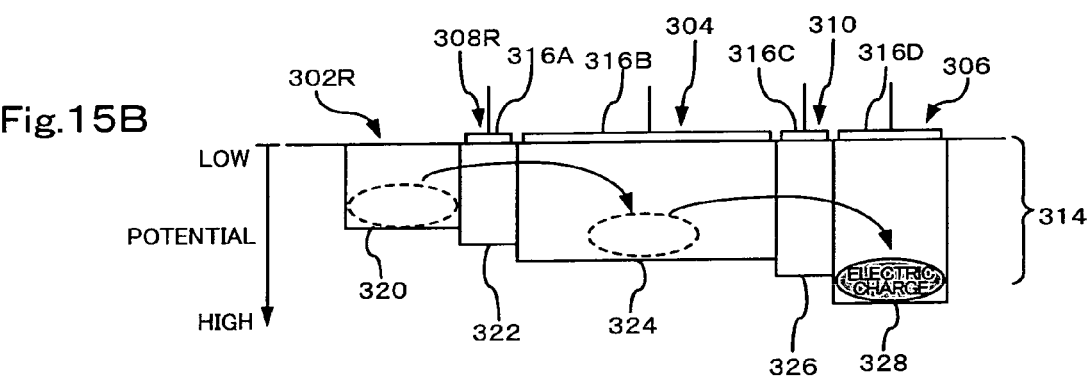
FIG. 15B is a diagram illustrating a state in which the electric charge generated at the photodiode 302R is transferred to an electric charge transferring section 306.
Figure 15C:
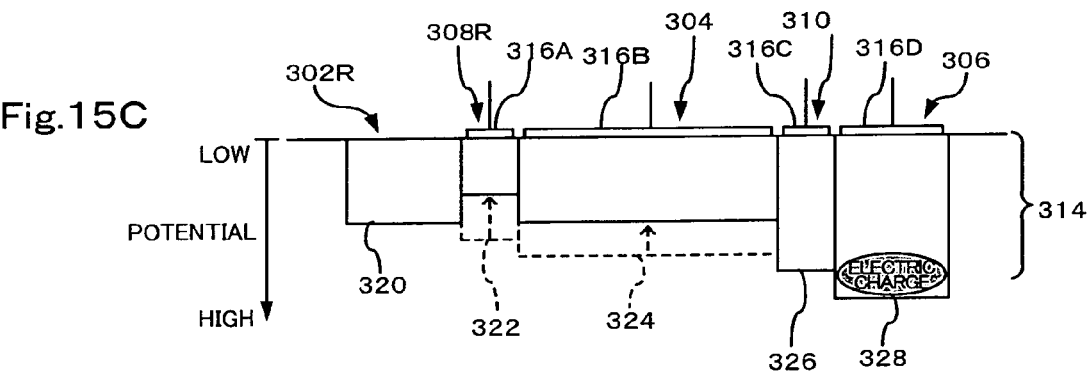
FIG. 15C and FIG. 15D are diagrams illustrating states after the electric charge generated at the photodiode 302R is transferred to the electric charge transferring section 306.
Figure 15D:
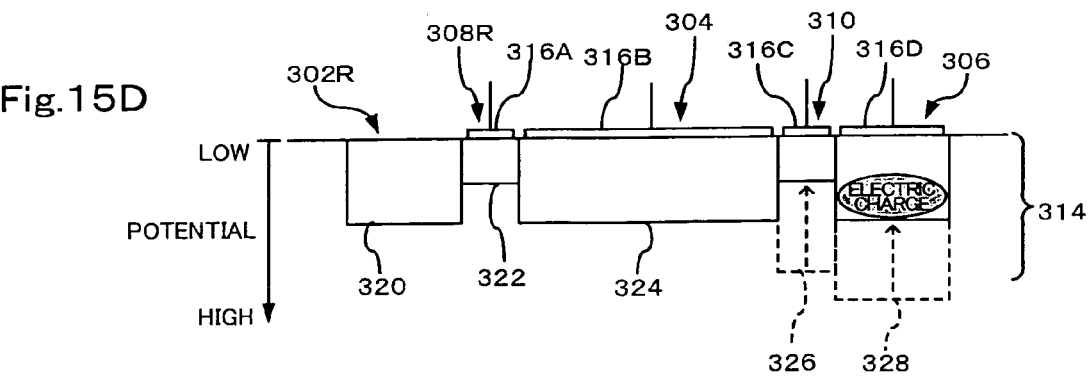

FIGS. 15A through 15D are cross-sectional views for schematically describing the method for transferring the electric charge generated at the red(R) photodiode 302R. FIG. 15A is a diagram illustrating a state in which an electric charge is generated at the photodiode 302R. FIG. 15B is a diagram illustrating a state in which the electric charge generated at the photodiode 302R is transferred to an electric charge transferring section 306. FIG. 15C and FIG. 15D are diagrams illustrating states after the electric charge generated at the photodiode 302R is transferred to the electric charge transferring section 306.

The photodiode 302R, the first gate 308R, the register 304, the second gate 310 and the electric charge transferring section 306 are formed on a semiconductor substrate 314, as shown in FIG. 15A.

The photodiode 302R is formed by the pn junction on the semiconductor substrate 314 as shown in FIG. 15A. When the photodiode 302R is irradiated with light from outside, electric charges are generated and accumulated in a potential well 320 that is formed by the pn junction according to the amount of the light received.

The first gate 308R, the register 304, the second gate 310 and the electric charge transferring section 306 are formed by respective electrode sections 316A, 316B, 316C and 316D that are provided on the semiconductor substrate 314. That is, the electrode sections 316A, 316B, 316C and 316D are formed in the positions respectively corresponding to the first gate 308R, the register 304, the second gate 310 and the electric charge transferring section 306. By applying a voltage respectively to the electrode sections 316A, 316B, 316C and 316D, depletion layers are formed in the semiconductor substrate 314 in the positions below the electrode sections 316A, 316B, 316C and 316D. By these depletion layers, as shown in FIG. 15A, the potential wells 322, 324, 326 and 328 are formed, which become the first gate 308R, the register 304, the second gate 310 and the electric charge transferring section 306, respectively.

In order to transfer the electric charge accumulated in the potential well 320 of the photodiode 302R to the electric charge transferring section 306, a high voltage is applied to the electrode sections 316A, 316B, 316C and 316D, and as shown in FIG. 15B, the potentials of the potential wells 322, 324, 326 and 328 of the first gate 308R, register 304, the second gate 310 and the electric charge transferring section 306 are increased. In this manner, the first gate 308R and the second gate 310 are opened. Here, the potentials of the potential wells 322, 324, 326 and 328 of the first gate 308R, the register 304, the second gate 310 and the electric charge transferring section 306 are set so that the potential increases in this order. In other words, the potential of the potential well 324 of the register 304 is set higher than that of the potential well 322 of the first gate 308R, the potential of the potential well 326 of the second gate 310 is set higher than that of the potential well 324 of the register 304, and the potential of the potential well 328 of the electric charge transferring section 306 is set higher than that of the potential well 326 of the second gate 310. A high voltage is applied to the electrode sections 316A, 316B, 316C, and 316D for a predetermined period of time. During such a period, the electric charge accumulated in the potential well 320 of the photodiode 302R is transferred from the photodiode 302R to the electric charge transferring section 306 through the first gate 308R, the register 304 and the second gate 310.

When the electric charge of the photodiode 302R is transferred to the electric charge transferring section 306 in this way, the first gate 308R that has been open is closed as shown in FIG. 15C. In this case, the potential of the potential well 322 of the first gate 308R is decreased by applying a low voltage to the electrode section 316A that corresponds to the first gate 308R, thereby closing the first gate 308R. In addition, in this case, a low voltage is applied to the electrode section 316B that corresponds to the register 304 as well, thereby lowering the potential of the potential well 324 of the register 304.

After that, as shown in FIG. 15D, the potential of the potential well 326 of the second gate 310 is decreased by applying a low voltage to the electrode section 316C that corresponds to the second gate 310, thereby closing the second gate 310. In addition, a low voltage is applied to the electrode section 316D that corresponds to the electric charge transferring section 306 as well, thereby lowering the potential of the potential well 328 of the electric charge transferring section 306.

The process for transferring the electric charge generated at the photodiode 302R to the electric charge transferring section 306 is thereby completed. The electric charge that has been transferred to the electric charge transferring section 306 is transferred to the detection section 312. The electric charge amount is detected by the detection section 312.

Light-receiving Conversion Element of the Image Sensor 72A for the Reflecting Original FIG. 13B is an explanatory diagram of the photoelectric conversion element of the image sensor 72A for the reflecting original. As described above, the reflecting original light source 66A is the LEDs in three colors of RGB. Therefore, light is separated on the side of the light source 66A of the LED into three color components of RGB, and the reflection light from the reflecting original 5A reaches the image sensor 72A as separated into three color components. Therefore, a monochrome photodiode 302M is used as the light receiving conversion element in the image sensor 72A, as shown in FIG. 13B.

Specifically, the image sensor 72A does not have a photodiode for each color of RGB as the light receiving conversion element, but only has the monochrome photodiode 302M. The photodiodes 302M are arranged in a row in the main-scanning direction to constitute the image sensor 72A. The photodiode 302M receives the reflection light in the colors of RGB that enters at a predetermined cycle. Based on the reflection light in three colors of RGB that has been received, the RGB gradation value data for one pixel that is the minimum unit of the image is generated.

The image sensor 72A is different from the above-described image sensor 72B for the transparent original in that the number of the photodiodes 302 of each group described above is reduced from three to one, and that accordingly the length of the register 304 is reduced. In other words, the configuration of the image sensor 72A corresponds to a configuration in which the above-described image sensor 72B includes only the photodiode 302G, which is the closest to the electric charge transferring section 306. Thus, description of the image sensor 72A is almost the same as the description of the above-described photodiode 302G, and therefore is omitted here.

Regarding the Linearity Defect of the Photodiode

Figure 16:
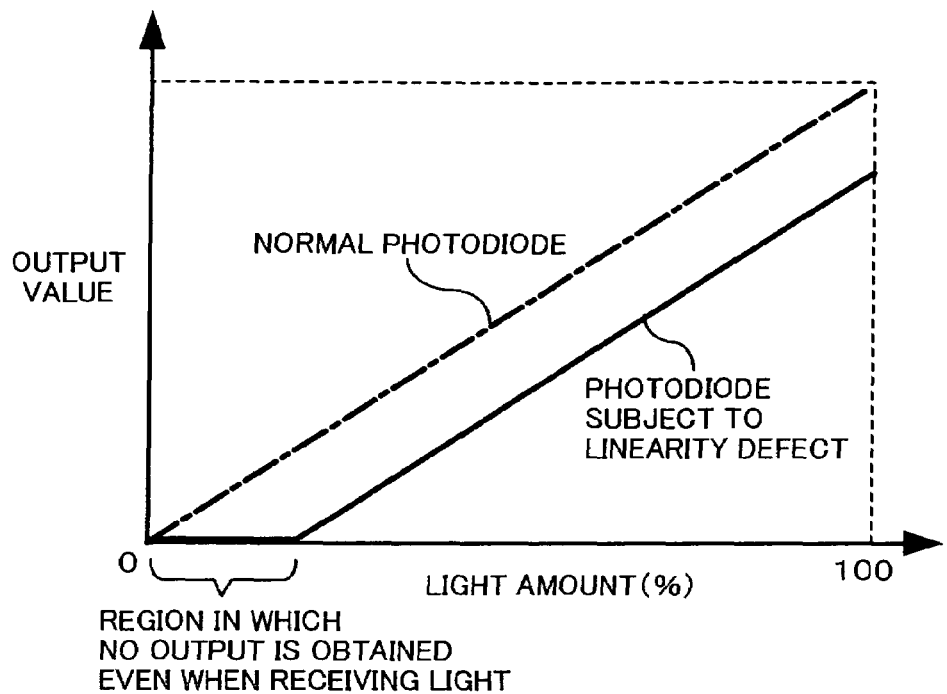
FIG. 16 is an explanatory diagram of the linearity defect of the photodiode.

FIG. 16 is an explanatory diagram of the linearity defect of the photodiode, and indicates the relation between the incident light amount on the photodiode and the output value from the detection section 312 (analog voltage signal that increases/decreases in proportion to the electric charge amount detected by the detection section 312). It should be noted that the dashed-dotted line in FIG. 16 indicates a case of a normal photodiode, and the solid line indicates a case of a photodiode subject to the linearity defect.

In the case of the normal photodiode indicated by the dashed-dotted line, the output value linearly varies over the entire range of the incident light amount. On the contrary, in the case of the photodiode subject to the linearity defect indicated by the solid line, in the small light amount range, there is a region in which the output cannot be obtained even if the photodiode receives light. Moreover, accordingly, in the large light amount range as well, the output value is smaller than the value that should be originally output for the corresponding light amount.

If such a photodiode subject to the linearity defect is present, the output value of such a photodiode varies from the output values of the photodiodes on both the adjacent sides thereof in the main-scanning direction, which may impair the continuity of the read image. For example, a defective image streak along the sub-scanning direction may appear in the read image.

For this reason, inspecting the linearity defect of the image sensor is examined as one of the pre-shipment inspections at the manufacturing line of the multifunction apparatus 1.

It should be noted that this inspection is conducted for the image sensor 72B for the transparent original only, and is not conducted for the image sensor 72A for the reflecting original. This is because the linearity defect hardly occurs to the image sensor 72A.

Figure 17:
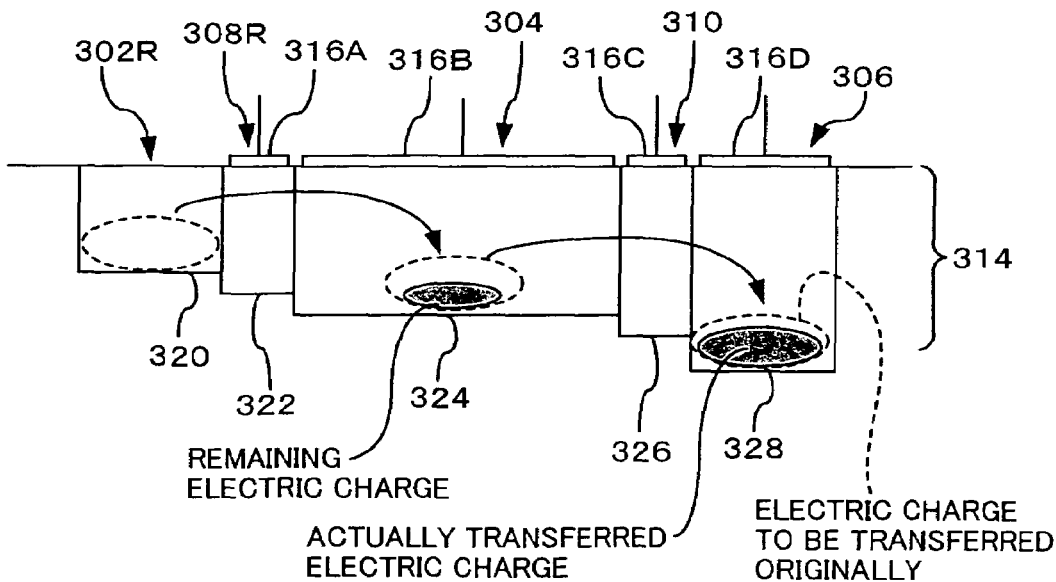
FIG. 17 is a cross-sectional view for schematically describing how an electric charge generated at the red (R) photodiode 302R is transferred through a register 304.

The reason for this is described with reference to FIG. 17. FIG. 17 is a cross-sectional view for schematically describing how an electric charge generated at the red(R) photodiode 302R is transferred through the register 304.

The original cause of the linearity defect lies in, for example, the fact that when the electric charge generated at the photodiode 302R is transferred to the electric charge transferring section 306, as shown in FIG. 17, part of the electric charge remains in the potential well 324 of the register 304. That is, since part of the electric charge remains in the register 304, the amount of the electric charge transferred to the detection section 312 is reduced by such a remaining amount, which results in decrease in the output detected by the detection section 312.

Therefore, it is considered that the longer the transfer distance of the electric charge in the register 304 is, the more the linearity defect occurs. That is, in the image sensor 72B in FIG. 13A, the linearity defect is likely to occur in the order of the photodiode 308R, photodiode 308B and photodiode 308G, i.e., in the descending order of the transfer distance in the register 304.

Examining the image sensor 72A for the reflecting original shown in FIG. 13B from this viewpoint, since the number of the photodiode 308M associated with each register 304 is one in the image sensor 72A, the transfer distance in the register 304 of the electric charge generated at the photodiode 308M is approximately as short as that of the electric charge generated at the above-described photodiode 308G. Therefore, the electric charge hardly remain in the register 304. As a result, the image sensor 72A for the reflecting original hardly causes the linearity defect because of its configuration, and thus it is not necessary to conduct inspection of the linearity defect for the image sensor 72A.

Pre-shipment Inspection for the Linearity Defect

Outline of the Inspection Method for Linearity Defect

Figure 18:
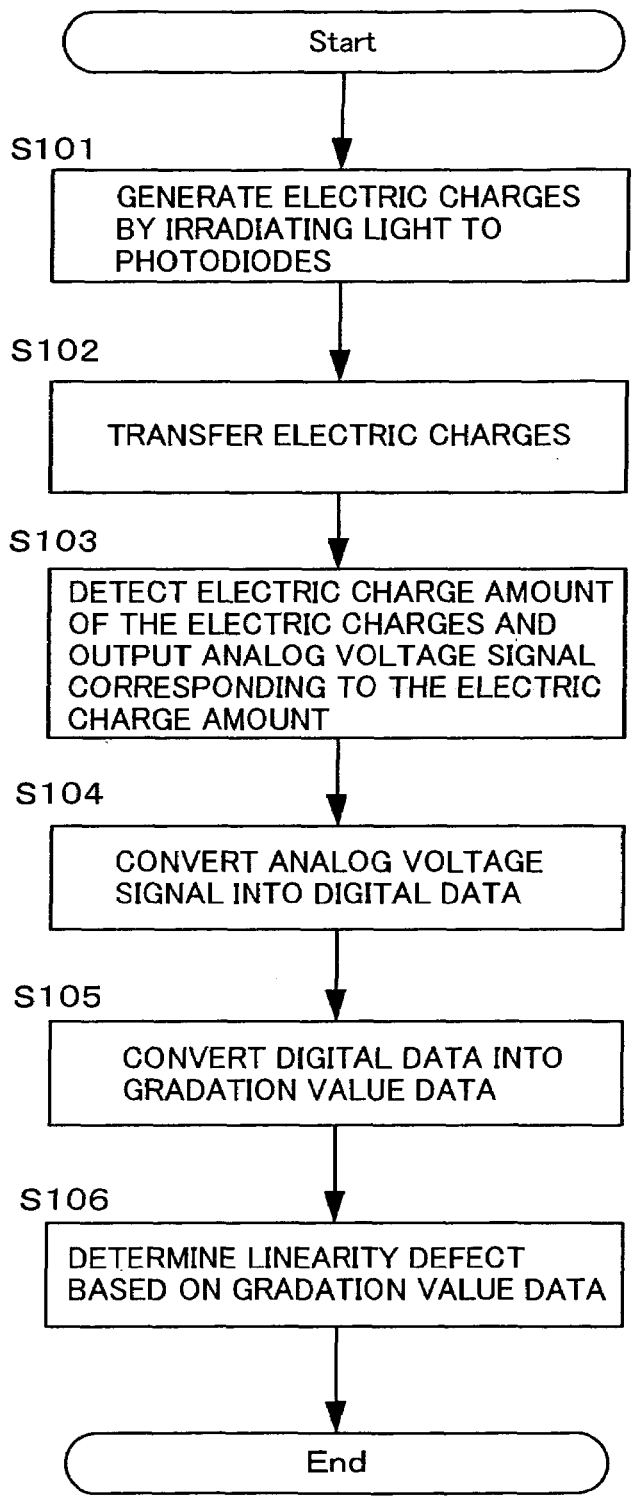
FIG. 18 is a flow chart for describing the outline of the inspection method of the linearity defect.
Figure 19A:
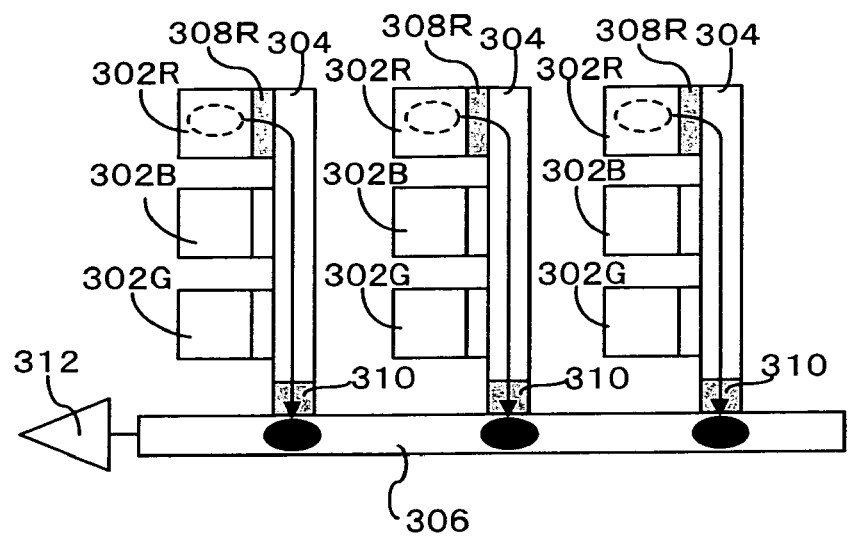
FIG. 19A and FIG. 19B are explanatory diagrams illustrating how electric charges generated at photodiodes for inspection of the linearity defect are transferred to a detection section 312.
Figure 19B:
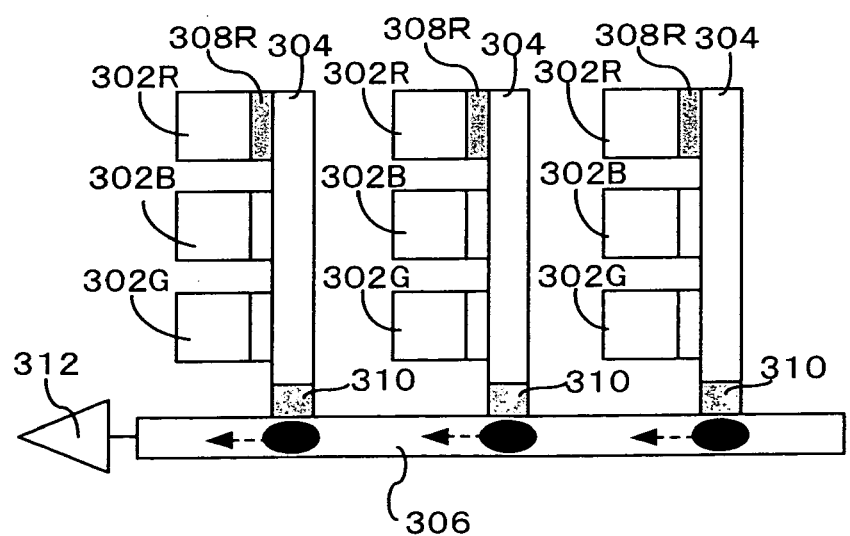

FIG. 18 is a flow chart for describing the outline of the inspection method of the linearity defect. FIG. 19A and FIG. 19B are explanatory diagrams illustrating how electric charges generated at the photodiodes for inspection of the linearity defect are transferred to the detection section 312. It should be noted that in this case, of the photodiodes 302R, 302B and 302G included in the image sensor 72B for the transparent original, only the photodiode 302R is described. However, other photodiodes 302B and 302G are also inspected in a similar manner.

Initially, the light from the transparent original light source 66B is emitted on the photodiode 302R to generate electric charges in the all photodiodes 302R as shown in FIG. 19A (S101). These generated electric charges are transferred to the electric charge transferring section 306 through the registers 304 (S102)

Next, as shown in FIG. 19B, the electric charge transferring section 306 transfers in order the electric charges to the detection section 312, and the detection section 312 detects the electric charge amount of the electric charges in that order, and outputs analog voltage signals in a magnitude that corresponds to the electric charge amount (S103). These analog voltage signals are output to the AFE section 210, converted to digital data at the AFE section 210, and converted into the gradation value data made up of 256 gradations, for example, through the digital signal processing circuit 216 (S104 and S105). Pieces of the gradation value data in the number of the photodiode 302R are output from the data output circuit 218 in the above-described order, and determination of the linearity defect is made based on the gradation value data (S106).

Figure 20:
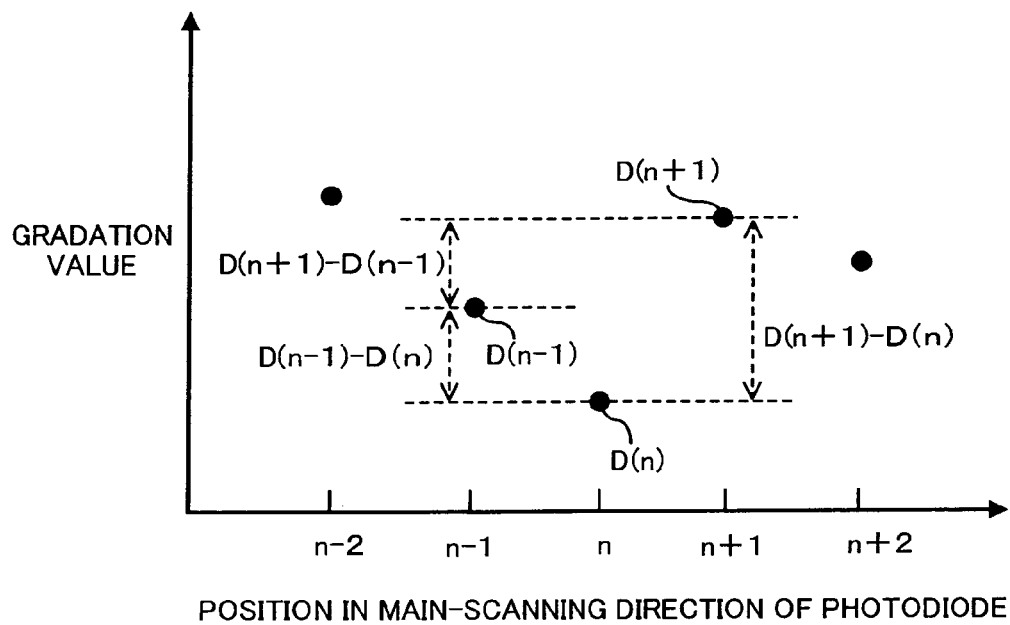
FIG. 20 is an explanatory diagram for determining the linearity defect performed in step S106.

FIG. 20 is an explanatory diagram for determining the linearity defect performed in step S106. The horizontal axis indicates the number indicating the order in which the data is output, namely, the position in the main-scanning direction of the photodiode 302R, and the vertical axis indicates the gradation value.

Assuming that the photodiode 302R located in the "n"th position in the main-scanning direction is subject to the determination, and the gradation value data thereof is D(n), whether the inspected photodiode 302R is subject to the linearity defect or not is determined according to the following expression.

$$|D(n-1)-D(n)|+|D(n+1)-D(n)|-|D(n+1)-D(n-1)|>Dth \quad \text{(Expression 1)}$$

Specifically, when the value of the left side of the Expression 1 that is calculated based on the gradation value data D(n) of the photodiode 302R subject to the determination, and the gradation value data D(n−1) and D(n+1) of photodiodes 302R located on both the adjacent sides thereof is greater than a desired threshold value Dth of the right side, the subject photodiode 302R is determined to be subject to the linearity defect.

This Expression 1 can be rewritten as the following Expression 2.

$$\text{Min}\,[|D(n-1)-D(n)|,\,|D(n+1)-D(n)|]>Dth' \quad \text{(Expression 2)}$$

Here, Min [X, Y] means the smaller value of X and Y.

In other words, when the smaller value of the absolute values of the deviation between the gradation value data D(n) of the photodiode 302R subject to the determination, and the respective gradation value data D(n−1) and D(n+1) of photodiodes 302R located on both the adjacent sides thereof, namely, |D(n−1)−D(n)| and |D(n+1)−D(n)|, is larger than the threshold value Dth', the subject photodiode 302R is determined to be subject to the linearity defect.

This is because if D(n+1)≧D(n−1)≧D(n), the left side of the above Expression 1 can be developed as follows:

$$(D(n-1)-D(n))+(D(n+1)-D(n))-$$
$$(D(n+1)-D(n-1))=2\times(D(n-1)-D(n))$$

and also, if D(n−1)≧D(n+1)≧D(n), the left side of the above Expression 1 can be developed as follows:

$$(D(n-1)-D(n))+(D(n+1)-D(n))-$$
$$(D(n+1)-D(n-1))=2\times(D(n+1)-D(n))$$

Determination according to the Expression 2 is recommended because it is possible to precisely detect the discontinuity of the gradation value data with respect to the main-scanning direction. In other words, when the gradation value data of the photodiode subject to the determination is different from the gradation value data of only one of the photodiodes located on both the adjacent sides thereof, the discontinuity of the gradation value data is not so much notable. However, when different from the gradation value data of the photodiodes located on both the adjacent sides, the discontinuity of the gradation value data is significantly conspicuous. Therefore, the photodiode 302R whose gradation value significantly differs from the gradation values of the photodiodes located on both the adjacent sides thereof is determined as subject to the linearity defect based on the Expression 2.

In addition, the reason for determining the linearity defect through the comparison with the adjacent photodiodes 302R is that the linearity defect frequently occurs in the unit of one photodiode, and it is rare that the linearity defect occurs over a plurality of adjacent photodiodes 302R.

Regarding the Pre-shipment Inspection of the Linearity Defect

Figure 21:
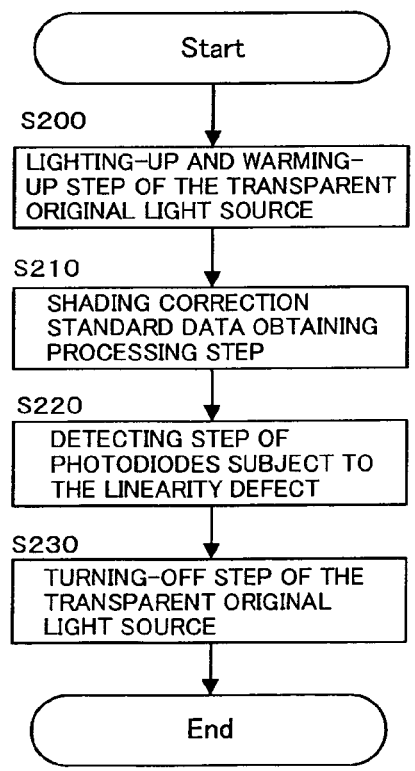
FIG. 21 is a flow chart of the pre-shipment inspection of the linearity defect.
Figure 22A:
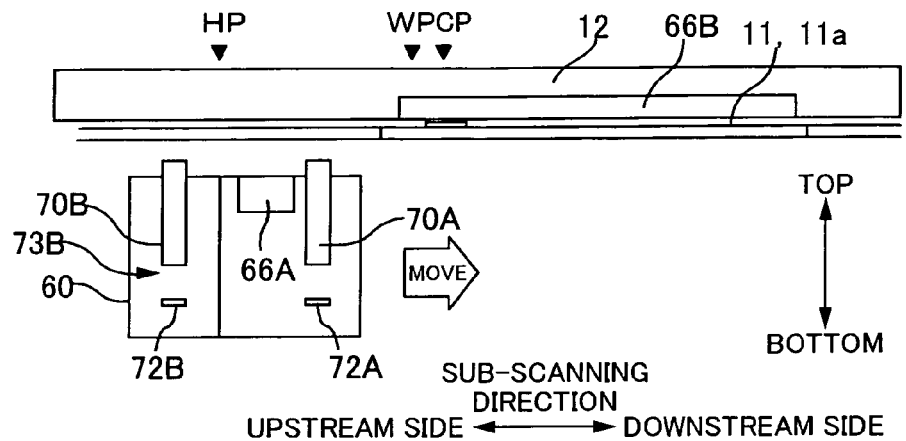
FIGS. 22A through 22C are explanatory diagrams illustrating the conditions of the scanner carriage 60 in each step of the pre-shipment inspection.
Figure 22B:
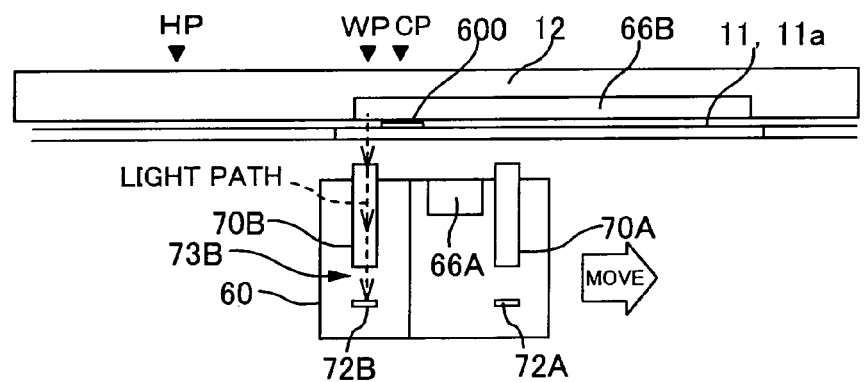
Figure 22C:
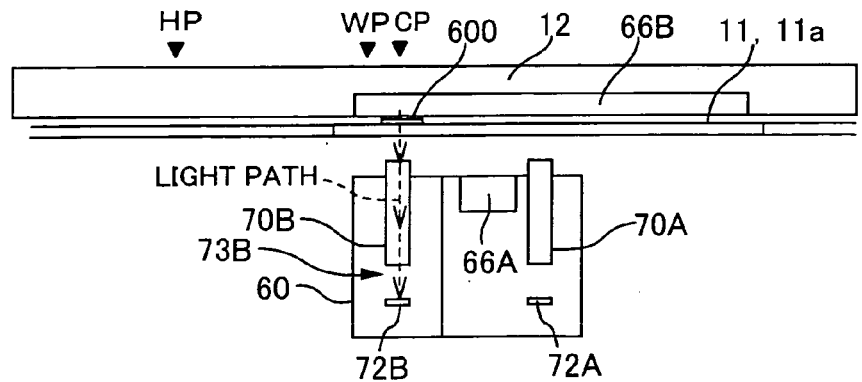

FIG. 21 is a flow chart of the pre-shipment inspection of the linearity defect. FIGS. 22A through 22C are explanatory diagrams illustrating the conditions of the scanner carriage 60 in each step of the pre-shipment inspection.

Initially, the inspection operator connects the multifunction apparatus 1 to be inspected to a computer on the inspection line using the USB interface 118. The inspection operator removes the reflecting plate 13 from the original table cover 12 of the multifunction apparatus 1 as shown in FIG. 8, and closes the original table cover 12 so that the transparent original light source 66B can irradiate the original table 11 with light.

Then, the CPU of the computer on the inspection line provides a command to the scanner controller 202 of the scanner control unit 210 of the multifunction apparatus 1, and carries out the following steps in order.

(1) "Lighting-Up And Warming-Up Step Of The Transparent Original Light Source 66B (S200)"

In this step, the scanner controller 202 first moves the scanner carriage 60 that stands still at the standby position HP of FIG. 22A downstream in the sub-scanning direction, so as to position the transparent original reading section 73B thereof at the warming-up position WP, as shown in FIG. 22B. At the warming-up position WP, as shown in FIG. 22B, an end portion of the transparent original light source 66B is located above the warming-up position WP, and thus it is possible for the light from the light source 66B to enter the image sensor 72B of the transparent original reading section 73B through the glass plate of the original table 11. The transparent original light source 66B is lighted up and its light amount is detected by the image sensor 72B. When the detected light amount becomes stable at a predetermined value, warming-up of the light source 66B is considered to be completed, and the inspection proceeds to the next step S210.

(2) "Shading Correction Standard Data Obtaining Processing Step (S210)"

In this step, the black standard data and the white standard data necessary for the shading correction are obtained. Specifically, the scanner controller 202 first turns off the transparent original light source 66B and thereafter lights up the same. Then, the scanner controller 202 causes the shading correction section 217 to generate the black standard data and the white standard data for each photodiode based on the output from each photodiode while the transparent original light source 66B is turned off and lighted up. The inspection proceeds to the next step S220. It should be noted that since the turning off period in this step is very short, the light source 66B that is lighted up immediately after being turned off is already sufficiently warmed up, and there is no need for warming up the light source 66B again.

(3) "Detecting step of photodiodes subject to the linearity defect (S220)"

In this step, the scanner controller 202 first moves the scanner carriage 60 further downstream in the sub-scanning direction, and as shown in FIG. 22C, positions the transparent original reading section 73B at the linearity defect inspection position CP. At the inspection position CP, a film body 600 with 1 to 5% transmittance is arranged in advance by the inspection operator. The light that has been transmitted through the film body 600 is received by the image sensor 72B to perform the above-described linearity defect determination.

In other words, the gradation value data generated by receiving the light is sequentially transmitted from the scanner control unit 104 of the multifunction apparatus 1 to the computer on the inspection line via the data output circuit 218 of the scanner control unit 104 and the USB interface 118. The CPU of the computer on the inspection line determines whether or not each photodiode is subject to the linearity defect based on the gradation value data and the above Expression 1. It should be noted that a determination program for determining the linearity defect is stored in the memory of the computer on the inspection line, and the determination program is read out by the CPU of the computer to perform the determination.

If there is a photodiode is determined as subject to the linearity defect, the positional information of the photodiode to identify the photodiode is transmitted from the computer on the inspection line to the multifunction apparatus 1, and the positional information is stored in the memory 92 of the controller 50 of the multifunction apparatus 1. The reason why the film body 600 with 1% to 5% transmittance is used in this step S220 is described later.

(4) "Turning-off step of the transparent original light source 66B (S230)"

In this step, the transparent original light source 66B is turned off. The pre-shipment inspection of the linearity defect is completed thereby. The multifunction apparatus 1 is shipped after other inspections of the same.

Figure 23A:
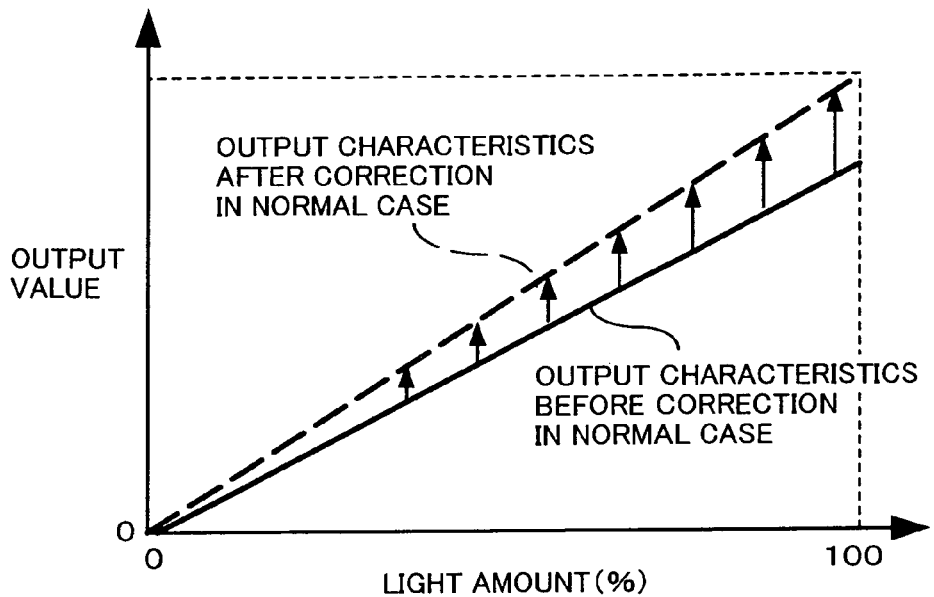
FIG. 23A and FIG. 23B are explanatory diagrams of the reason for using a film body 600 with 1% to 5% transmittance at the inspection of the linearity defect.
Figure 23B:
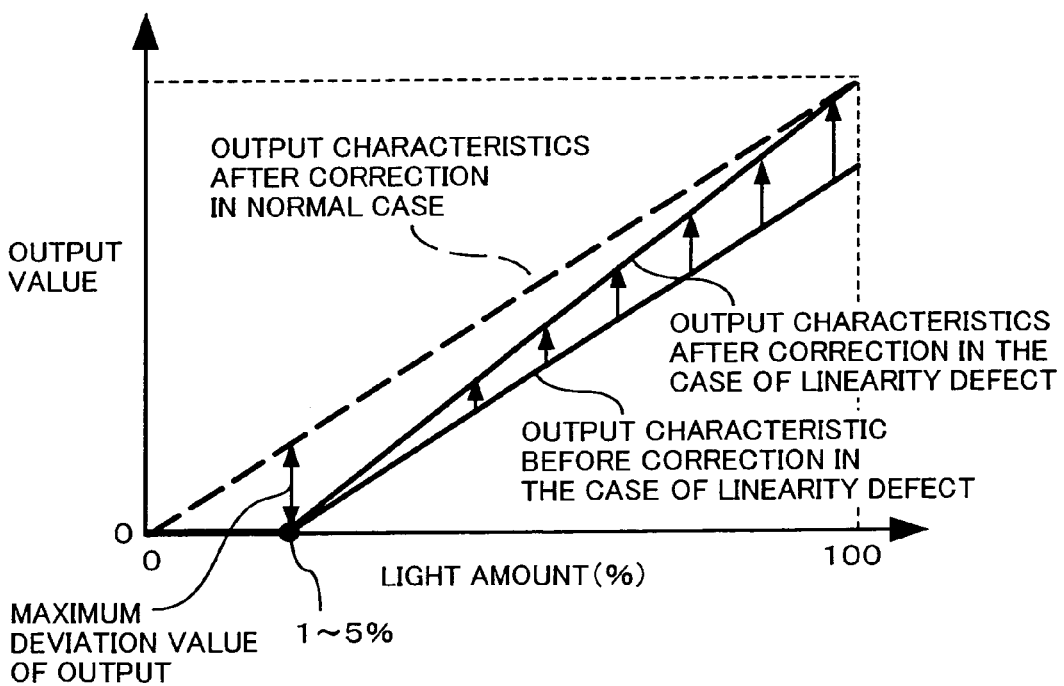

Reason for Using the Film Body 600 with 1% to 5% Transmittance in Detecting the Linearity Defect FIG. 23A and FIG. 23B are explanatory diagrams of the reason for using the film body 600 with 1% to 5% transmittance at the inspection of the linearity defect. Both of FIG. 23A and FIG. 23B show the relation between the incident light amount on the photodiode and the output value from the detection section 312. FIG. 23A shows a case of a normal photodiode, and FIG. 23B shows a case of a photodiode subject to the linearity defect.

In the case of the normal photodiode, as shown in FIG. 23A, the output of the detection section 312 is in direct proportion to the incident light amount on the photodiode. Even when the shading correction is performed with respect to the output with such output characteristics, since the correction is basically performed through multiplication correction using the above-described gain values, such direct proportion output characteristics are maintained also after the correction (see the dashed line).

In contrast, in the case of the photodiode subject to the linearity defect, as shown in FIG. 23B, even if the light amount received by the photodiode increases, the output is not obtained unless the light amount reaches a certain amount. Therefore, it is impossible to obtain the linear output characteristics over the entire range of the light amount. Even when the shading correction is performed with respect to the output with such output characteristics, the output characteristics obtained by multiplying the same by the above-described gain values still have a region in which the output is not obtained in the small light amount range. Therefore, the output characteristics after the correction are as illustrated in FIG. 23B.

By comparing the output characteristics after the correction of the normal photodiode and the output characteristics after the correction of the photodiode subject to the linearity defect with reference to FIG. 23B, it is found that the deviation between the respective outputs becomes the maximum at the light amount with which the output of the photodiode subject to the linearity defect begins to be obtained. Accordingly, when detecting the linearity defect, the detection sensitivity can be improved to the maximum when such a light amount is incident on photodiodes. In addition, the light amount with which the output begins to be obtained is, when the maximum detected light amount of the photodiode is assumed to be 100%, approximately 1 to 5% thereof.

As a result, if the light from the transparent original light source 66B is transmitted through the film body 600 with 1% to 5% transmittance and is received by the photodiodes, the output difference between the normal photodiode and the photodiode subject to the linearity defect can be maximized, and the detection sensitivity for the linearity defect can be improved to the maximum. For this reason, the film body 600 with 1% to 5% transmittance is used in the linearity defect inspection.

Problem in Determining Photodiodes Subject to the Linearity Defect Only by the Pre-shipment Inspection As described above, the positional information for identifying a photodiode subject to the linearity defect is stored in the memory 92 of a shipped multifunction apparatus 1. Therefore, when such a multifunction apparatus 1 reads an image from the transparent original 5B, the photodiode subject to the linearity is not used in reading the image. The gradation value data of the photodiode subject to the linearity defect is, for example, generated by interpolation based on the gradation value data of the photodiodes located on both the adjacent sides of the photodiode subject to the linearity defect. As a result, the defective image streak that may appear in the read image can be prevented.

However, the occurrence of the linearity defect in the photodiode is temperature-dependent, and the linearity defect is more likely to occur in a low temperature environment. Therefore, even a photodiode that had a favorable evaluation in the pre-shipment inspection may cause the linearity defect depending on the use environment on the user's side after shipment.

Accordingly, in the multifunction apparatus 1 of the present embodiment, the above-described linearity defect detection is performed during a period from the power-up to the reading operation of the multifunction apparatus 1 (see FIG. 24).

In this manner, even if the use temperature environment changes after shipment, since the linearity defect is detected under such an environment, it is possible to specify the photodiode that may cause the linearity defect under the environment without fail. As a result, it is possible to prevent the defective image streak from appearing in the reading image without fail.

Regarding the Flow from the Power-up to the Reading Operation of the Multifunction Apparatus 1 of Present Embodiment FIG. 24 is a flow chart from the power-up to the reading operation of the multifunction apparatus 1 of the present embodiment. FIGS. 25A through 25C and FIGS. 26A through 26C are explanatory diagrams illustrating the conditions of the scanner carriage 60 in each step of the flow chart of FIG. 24.

It should be noted that this flow chart is performed by the CPU 90 of the controller 50 of the multifunction apparatus 1 reading out programs corresponding to this flow from the memory 92 of the controller 50, and controlling the scanner control unit 104 according to the programs. Although the following description is stated as if the CPU 90 directly controlled the respective structural equipments of the scanner control unit 104, in actuality, the CPU 90 provides commands to the scanner controller 202 of the scanner control unit 104, and the scanner controller 202 controls the structural equipments based on the commands.

Figure 25A:
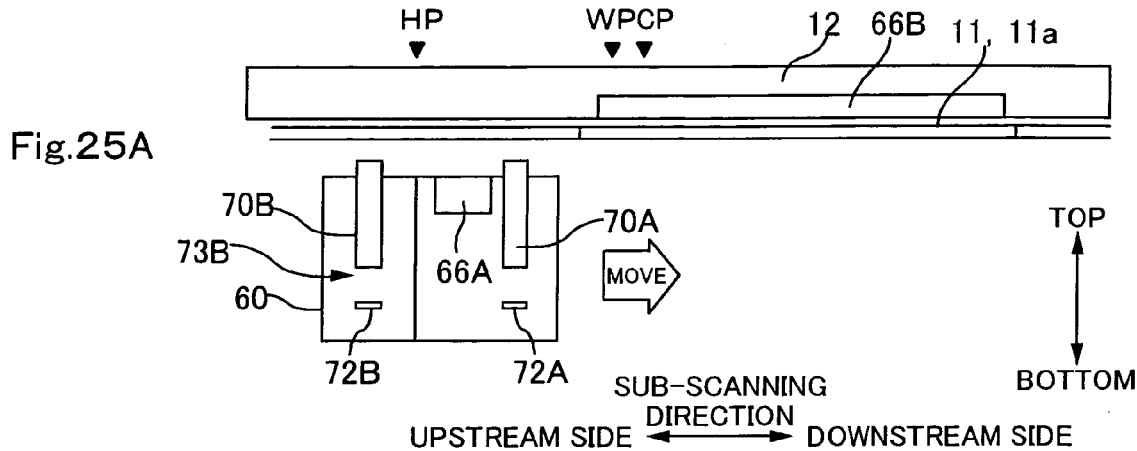
FIGS. 25A through 25C are explanatory diagrams illustrating the conditions of the scanner carriage 60 in each step of the flow chart of FIG. 24.

First, when the user presses the power button 82 of the multifunction apparatus 1, the multifunction apparatus 1 is powered on. When the CPU 90 receives a power-up signal (step S310), the flow proceeds to step S320 and the CPU 90 moves the scanner carriage 60 to the standby position HP in the sub-scanning direction as shown in FIG. 25A as starting up preparation of the multifunction apparatus 1. Next, the flow proceeds to step S330 and the multifunction apparatus 1 stands by in such a state until it receives an image reading command.

At this point, a user places the original 5 on the placement surface 11*a* of the original table 11. In the case of the reflecting original 5A, only the reflecting original 5A is placed on the placement table 11*a* as shown in FIG. 2. In the case of the transparent original 5B, the transparent original 5B is placed on the placement surface 11*a* as held in the transparent original holder 500 for holding the transparent original 5B, as shown in FIG. 9. In the case of the transparent original 5B, in order to put the transparent original light source 66B that is housed in the original table cover 12 to a usable state, the reflecting plate 13 in the back surface of the original table cover 12 is removed as well (see FIG. 8). Then, the user closes the original table cover 12.

Next, when the original type selection button 87A (87B), the scan mode button 86 and the start button 89D, etc. are pressed in order and the CPU 90 receives an image reading command, the flow proceeds to step S340 and the CPU 90 determines whether the reading command relates to the reflecting original 5A or the transparent original 5B. If the CPU 90 determines that it is a reading command of the transparent original 5B, the flow proceeds to step S350. If the CPU 90 determines that it is a reading command of the reflecting original 5A, the flow proceeds to step S450.

It should be noted that this determination is performed based on whether the original type information attached to the reading command is transparent original information or reflecting original information. This original type information is attached to the reading command by pressing the original type selection button 86A (86B). From now on, the flow for the case in which the transparent original information is attached is described first, and thereafter the flow for the case in which the reflecting original information is attached is described.

Figure 25B:
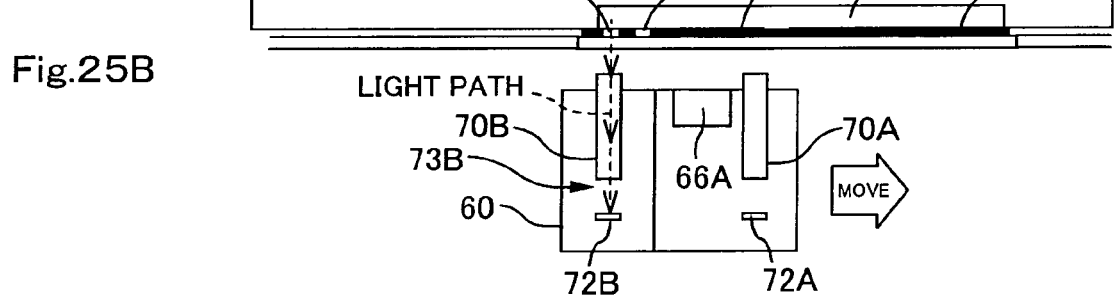

In Cases Where Transparent original Information is Attached to the Reading Command When the transparent original information is attached to the reading command, the flow proceeds to step S350, "lighting-up and warming-up step of the transparent original light source". The CPU 90 moves the scanner carriage 60 downstream in the sub-scanning direction to position the transparent original reading section 73B thereof at the warming-up position WP, as shown in FIG. 25B. At the warming-up position WP, as shown in FIG. 25B, an end portion of the transparent original light source 66B is located above, and also the lighting checking slit 512 of the transparent original holder 500 is positioned. Thus, it is possible for the light from the light source 66B to directly enter the image sensor 72B through the glass plate of the original table 11 and the lighting checking slit 512 of the transparent original holder 500. The light source 66B is then lighted up and its light amount is detected by the image sensor 72B. When the detected light amount becomes stable at a predetermined value, warming-up of the light source 66B is considered to be completed, and the flow proceeds to the next step S360.

In step S360, the "shading correction standard data obtaining step", the black standard data and the white standard data necessary for the shading correction are obtained. Specifically, the transparent original light source 66B is first turned off and thereafter lighted up. Then, the shading correction section 217 generates the black standard data and the white standard data for each photodiode based on the output from each photodiode of the image sensor 72B while the reflecting original light source 66B is turned off and lighted up. Then, the flow proceeds to the next step S370.

Figure 25C:
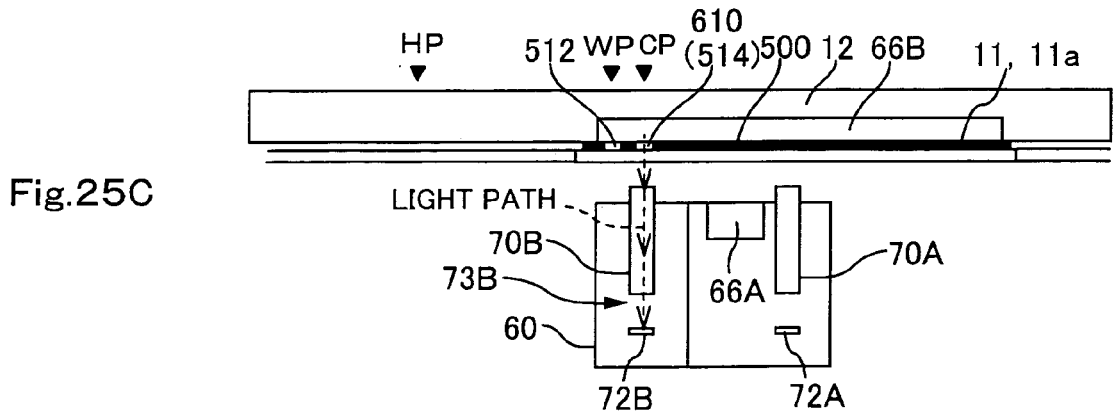

In step S370, the "detecting step of photodiodes subject to the linearity defect", the CPU 90 first moves the scanner carriage 60 further downstream in the sub-scanning direction to position the transparent original reading section 73B thereof at the linearity defect inspection position CP, as shown in FIG. 25C. At this inspection position CP, the above-described linearity defect detection film body 610 of the transparent original holder 500 is located. The light from the transparent original light source 66B is received by the photodiode of the image sensor 72B after it is transmitted through the film body 610, and the above-described linearity defect determination is performed.

In other words, the gradation value data generated by receiving the light is sequentially transmitted from the scanner control unit 104 to the CPU 90 via the data output circuit 218 of the scanner control unit 104. The CPU 90 (corresponding to a determination section) determines whether or not each photodiodes is subject to the linearity defect based on the gradation value data and the above Expression 1. It should be noted that a determination program for determining the linearity defect is stored in advance in the memory 92 of the controller 50, and the determination program is read out by the CPU 90 to perform the linearity defect determination.

If a photodiode is determined as subject to the linearity defect, the positional information of the photodiode to identify the photodiode is stored in the memory 92. If other positional information is already stored in the memory 92, that positional information is deleted and only the positional information of the photodiode that is determined as subject to the linearity defect this time is stored. Then, the flow proceeds to the next step S380.

In step S380, the "reading step of images from the transparent original", while the scanner carriage 60 is further moved downstream in the sub-scanning direction, image in the reading region is read by the image sensor 72B receiving the light that has been transmitted through the transparent original 5B.

During this reading, the CPU 90 transmits the positional information of the photodiode subject to the linearity defect that is stored in the memory 92 to the digital signal processing circuit 216 of the scanner control unit 104. The digital signal processing circuit 216 deletes the gradation value data corresponding to the photodiode subject to the linearity defect based on the positional information, and instead, generates by interpolation the substitute gradation value data based on the gradation value data of the photodiodes located on both the adjacent sides thereof. When the scanner carriage 60 reaches outside of the reading region, the flow proceeds to the next step S390.

In step S390, the "turning-off step of the transparent original light source", the CPU 90 turns off the transparent original light source 66B while moving the scanner carriage 60 back to the standby position HP. Then, the flow goes back to step S330, and the multifunction apparatus 1 stands by until it receives the next reading command.

Figure 26A:
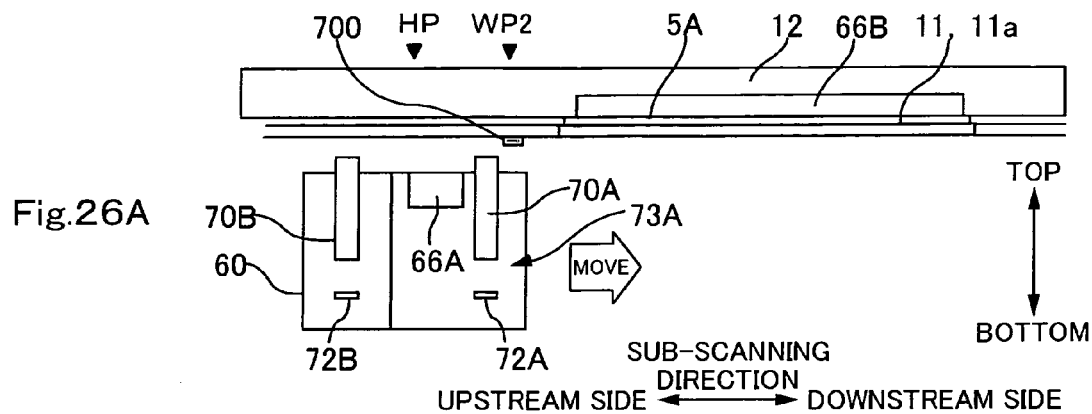
FIGS. 26A through 26C are explanatory diagrams illustrating the conditions of the scanner carriage 60 in each step of the flow chart of FIG. 24.
Figure 26B:
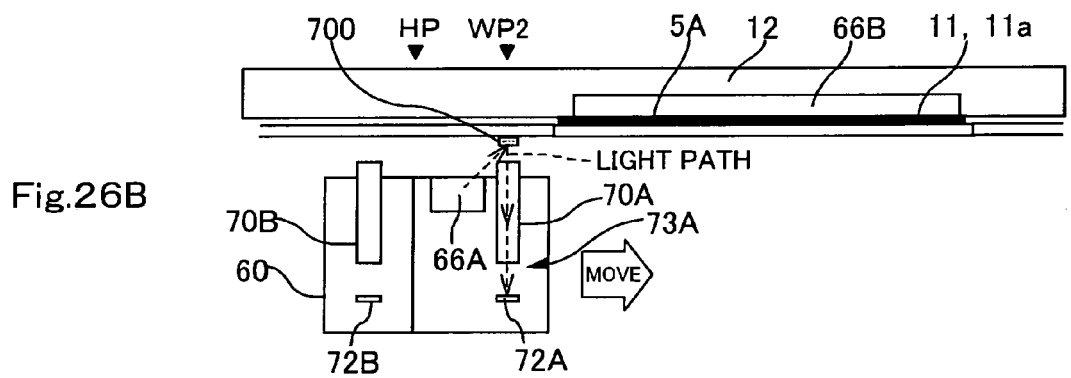

In Cases Where Reflecting Original Information is Attached to the Reading Command On the other hand, when the reflecting original information is attached to the reading command, the flow moves from step S340 to step S450, "lighting-up and warming-up step of the reflecting original light source". The CPU 90 moves the scanner carriage 60 at the standby position HP indicated in FIG. 26A downstream in the sub-scanning direction, so as to position the reflecting original reading section 73A at a second warming-up position WP2, as shown in FIG. 26B. At the second warming-up position WP2, as shown in FIG. 26B, a white standard plate 700 is located above the second warming-up position WP2. The light from the reflecting original light source 66A can enter the image sensor 72A as reflected by the white standard plate 700. LEDs in three colors as the light source 66A are lighted up in order, and their light amounts are detected by the image sensor 72A. When the detected light amounts become stable at a predetermined value, warming-up of the light source 66A is considered to be completed, and the flow proceeds to the next step S460.

In step S460, the "shading correction standard data obtaining step", the black standard data and the white standard data necessary for the shading correction are obtained. Specifically, the LEDs in RGB as the reflecting original light source 66A are all turned off and thereafter the LEDs in RGB are lighted up in order. Then, the shading correction section 217 generates the black standard data and the white standard data for each color of RGB of each photodiode based on the output from each photodiode of the image sensor 72A while the reflecting original light source 66A is turned off and lighted up. Then, the flow proceeds to the next step S480.

It should be noted that in the case of the transparent original 5B described above, the "detecting step of photodiodes subject to the linearity defect (step S370)" is performed at this timing. However, such a step is not performed in this case of the reflecting original 5A. This is because as described above, since the image sensor 72A for the reflecting original includes a monochrome photodiode whose register 304 is short in length, there is little possibility for the occurrence of the linearity defect, and thus the inspection of the linearity defect is not necessary.

Figure 26C:
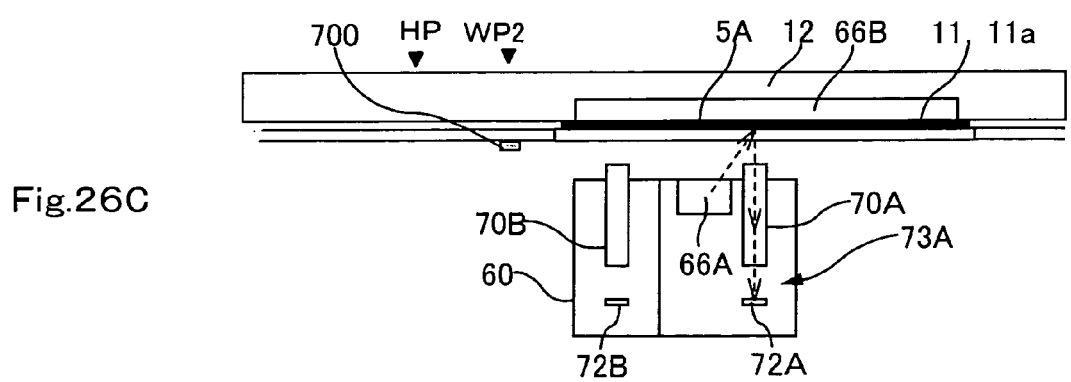

In step S480, the "reading step of images from the reflecting original 5A", while the scanner carriage 60 is moved downstream in the sub-scanning direction, as shown in FIG. 26C, image in the reading region is read by the image sensor 72A receiving the reflection light from the reflecting original 5A. When the scanner carriage 60 reaches outside of the reading region, the flow proceeds to the next step S490.

In step S490, the "turning-off step of the reflecting original light source 66A", the CPU 90 turns off the reflecting original light source 66A while moving the scanner carriage 60 back to the standby position HP. Then, the flow goes back to step S330, a and the multifunction apparatus 1 stands by until it receives the next reading command.

Figure 27:
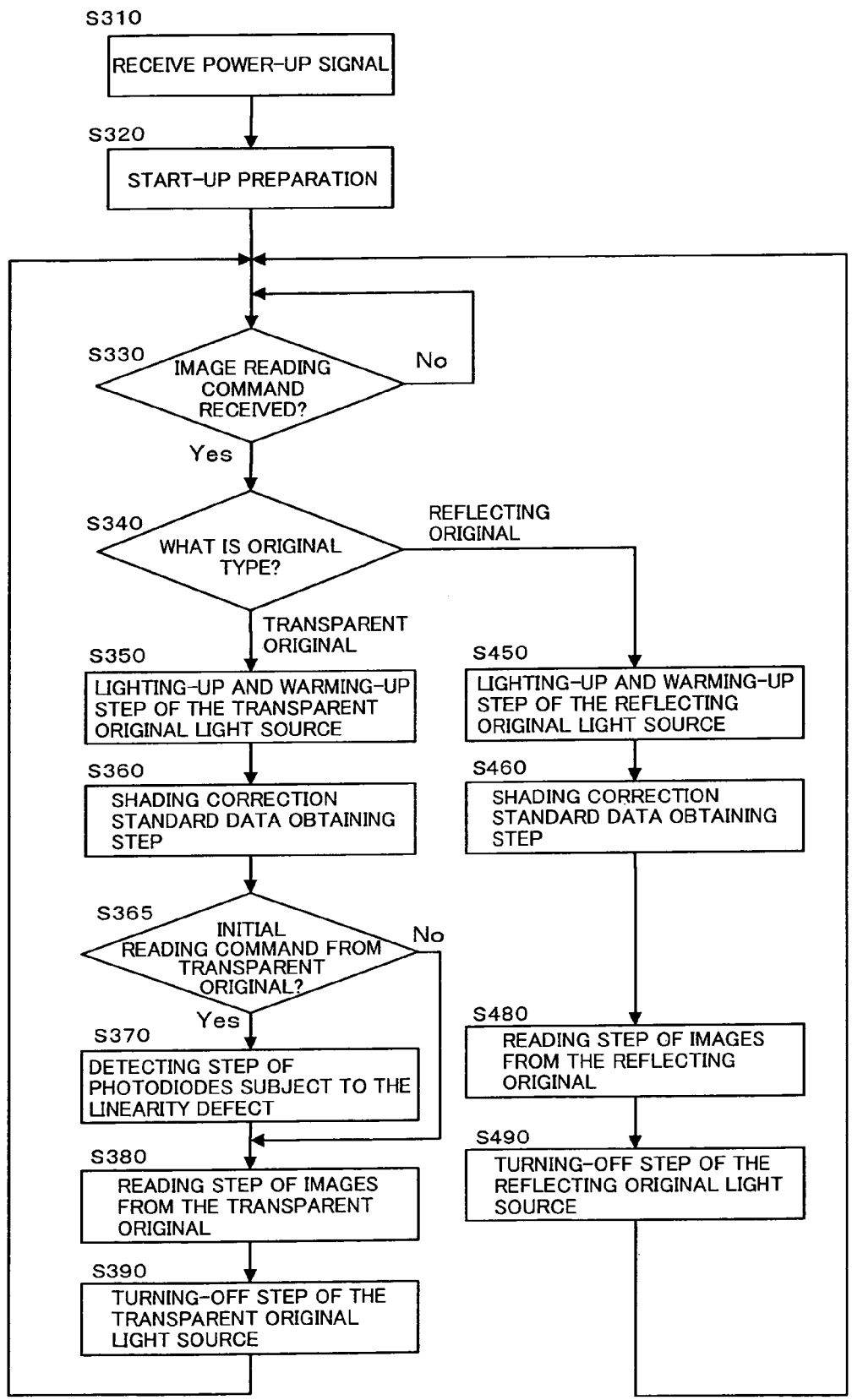
FIG. 27 is a modified example of the flow chart from power-up to the reading operation.

Regarding Modified Example of the Flow from the Power-up to the Image Reading Operation FIG. 27 shows a modified example of the flow chart from the power-up to the reading operation.

In the foregoing embodiment, as shown in FIG. 24, step S370, the "detecting step of photodiodes subject to the linearity defect" was performed in every image reading operation from the transparent original 5B. However, in this modified example, as shown in FIG. 27, the "detecting step of photodiodes subject to the linearity defect" is performed only for the initial image reading operation from the transparent original 5B after the power-up, and this "detecting step of photodiodes subject to the linearity defect" is omitted for the subsequent image reading operations from the transparent original 5B.

That is, this modified example is different from the foregoing embodiment mainly in that step S365 is added in FIG. 27. Other portions are substantially the same as the foregoing embodiment (FIG. 24). Therefore, step S365 is mainly described in the description below.

In step S365, it is determined whether or not a current reading command is the initial reading command for the transparent original 5B after the power-up. When it is determined that it is the initial reading command for the transparent original 5B, after performing step S370, the "detecting step of photodiodes subject to the linearity defect", step S380, the "reading step of images from the transparent original 5B" is performed. When it is determined that it is not the initial reading command for the transparent original 5B at step S365, step S370, the "detecting step of photodiodes subject to the linearity defect" is bypassed and step S380, the "reading step of images from the transparent original 5B" is performed.

In the case of a reading command that is not the initial reading command, in the "reading step of images from the transparent original 5B", the photodiode subject to the linearity defect is specified based on the positional information stored in the memory 92 of the controller 50. Specifically, in the memory 92 of the controller 50, the positional information of the photodiode subject to the linearity defect is already stored by the "detecting step of photodiodes subject to the linearity defect" that has been performed in the initial reading step. The photodiode subject to the linearity defect is specified based on the positional information, the gradation value data corresponding to the photodiode is deleted, and instead, the substitute gradation value data is generated by interpolation based on the gradation value data of the photodiodes located on both the adjacent sides thereof, to form the image data.

The positional information used in the initial reading step can be used for the second and subsequent reading steps for the reason described below. The linearity defect occurs more easily as the temperature becomes lower. After the power-up of the multifunction apparatus 1, the internal temperature thereof increases along with the electricity consumption. Based on this, the time before the initial reading step after the power-up is the time at which the internal temperature of the multifunction apparatus 1 is the lowest. Therefore, if the linearity defect is detected at this time, there is little possibility that the linearity defect occurs later to a photodiode that had a favorable evaluation in the detection at that time. As a result, it is guaranteed that the photodiode that may cause a defective image is specified without fail.

Other Embodiments

The present invention was described based on an embodiment using the multifunction apparatus 1 as an example. The foregoing embodiment is for the purpose of elucidating the present invention, and is not to be interpreted as limiting the present invention. The invention can of course be altered and improved without departing from the gist thereof, and includes functional equivalents. In particular, embodiments mentioned below are also included in the present invention.

Regarding the Photoelectric Conversion Element

In the foregoing embodiment, photodiodes 302R, 302B, 302G and 302M were used as the "photoelectric conversion element". However, the "photoelectric conversion element" is not limited to photodiodes 302R, 302B, 302G and 302M. In other words, any element may be used as long as it generates an electric charge due to the photoelectric effect.

Regarding Detection of Photodiodes Subject to the Linearity Defect

In the foregoing embodiment, the linearity defect was detected only for the image sensor 72B for the transparent original. However, the linearity defect may be detected for the image sensor 72A for the reflecting original that includes the above-described monochrome photodiodes.

Figure 28:
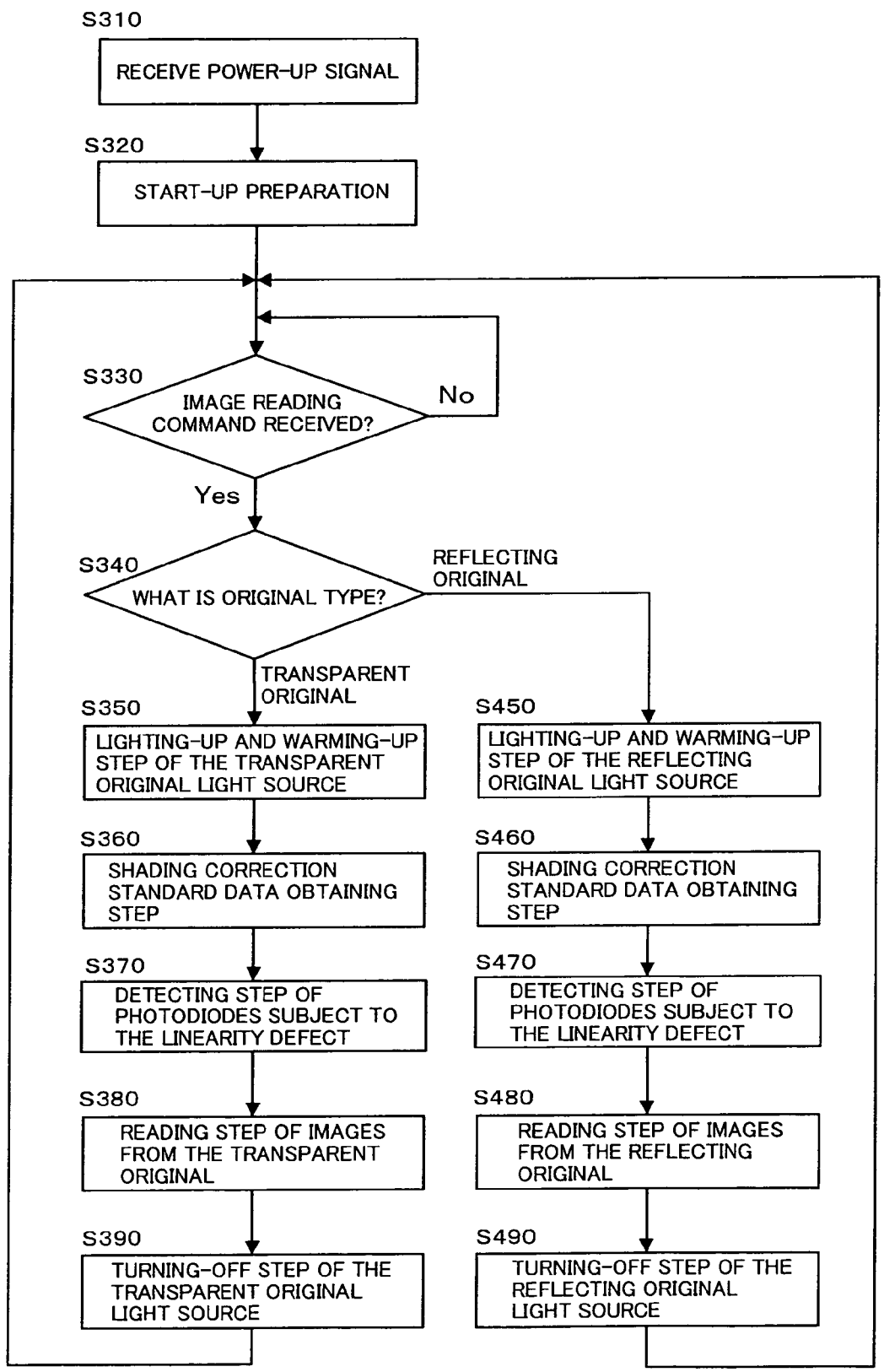
FIG. 28 is a flow chart from power-up to the reading operation when "inspection steps for detecting photodiodes subject to the linearity defect" are performed with respect to an image sensor 72B for the reflecting original.

In such a case, a "detecting step of photodiodes subject to the linearity defect" is added as step S470 between step S460 and step S480 in the flow chart of FIG. 24, as shown in FIG. 28. In addition, in the multifunction apparatus 1, a standard plate 620 with 1% to 5% reflectance is provided in the downstream side in the sub-scanning direction of the white standard plate 700, as shown in FIG. 29.

Figure 29:
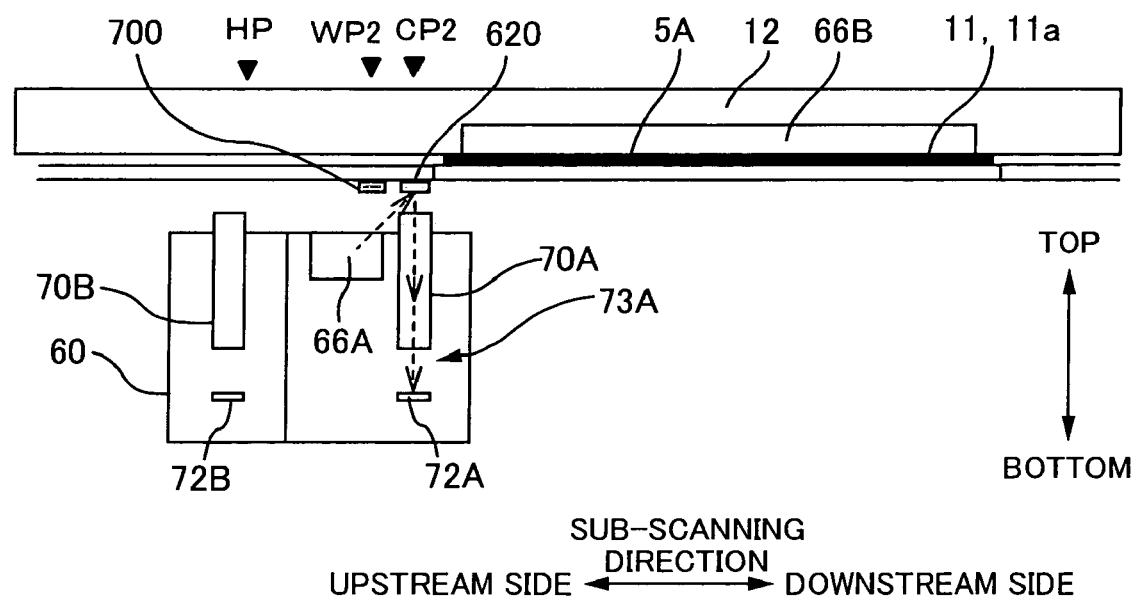
FIG. 29 is an explanatory diagram illustrating the condition of the scanner carriage 60 during the "inspection steps for detecting photodiodes subject to the linearity defect" in the flow chart of FIG. 28.

In step S470, the scanner carriage 60 is moved from the second warming-up position WP2 downstream in the sub-scanning direction, and as shown in FIG. 29, the reflecting original reading section 73A thereof is positioned below the setting position CP2 of the standard plate 620, then the LEDs in the colors of RGB of the reflecting original light source 66A are lighted up in order. The reflection light from the standard plate 620 is received by the photodiodes of the image sensor 72B, and whether or not each photodiodes is subject to the linearity defect is determined for each color of RGB of each photodiode based on the gradation value data output from the scanner control unit 104 by receiving the light and the above-described Expression 1.

What is claimed is:

1. An original holder of an image reading apparatus that reads an image of an original based on an amount of an electric charge generated by a photoelectric conversion element due to received light, when the original placed on a placement surface is illuminated by a light source, comprising:
   an original holder body placed on the placement surface while holding the original so as to position the original on the placement surface, the original holder body having a slit; and
   a filter member with a predetermined transmittance that transmits light from the light source to be received by the photoelectric conversion element,
   wherein the filter member covers the slit.

2. An original holder according to claim 1,
   wherein the filter member is a film body.

3. An original holder according to claim 1,
   wherein the original is a transparent original, and
   wherein the photoelectric conversion element receives the light from the light source that has been transmitted through the transparent original, when reading an image from the original.

4. An original holder according to claim 1,
   wherein photoelectric conversion elements are arranged lined up along a predetermined direction,
   wherein a reading operation of an image from the original is performed by the photoelectric conversion element moving in a direction that intersects the predetermined direction,
   wherein at power-up, the photoelectric conversion element stops at a predetermined standby position in the predetermined direction, and
   wherein when the original holder body is placed on the placement surface, the filter member is provided at a portion that is closer to the standby position than the original.

5. An original holder according to claim 4,
   wherein a length in the predetermined direction of the filter member is set to a length that exceeds an image of the original in the predetermined direction.

6. An original holder according to claim 1,
   wherein of a pair of engagement sections that engage with each other, one of the engagement sections is formed on the placement surface, and the other engagement section is formed in the original holder body, and
   wherein in a state in which the engagement sections are engaged with each other, the position of the original held by the original holder body is positioned at a position in which the image of the original can be read by the photoelectric conversion element.

7. An original holder of an image reading apparatus that reads an image of an original based on an amount of an electric charge generated by a photoelectric conversion element due to received light, when the original placed on a placement surface is illuminated by a light source, comprising:

an original holder body placed on the placement surface while holding the original so as to position the original on the placement surface, the original holder body having a slit; and a filter member with a predetermined transmittance that transmits light from the light source to be received by the photoelectric conversion element, wherein the filter member covers the slit, wherein the filter member is a film body, and the original is a transparent original, the photoelectric conversion element receives the light from the light source that has been transmitted through the transparent original, when reading an image from the original, photoelectric conversion elements are arranged lined up along a predetermined direction, a reading operation of an image from the original is performed by the photoelectric conversion element moving in a direction that intersects the predetermined direction, at power-up, the photoelectric conversion element stops at a predetermined standby position in the predetermined direction, and when the original holder body is placed on the placement surface, the filter member is provided at a portion that is closer to the standby position than the original, a length in the predetermined direction of the filter member is set to a length that exceeds an image of the original in the predetermined direction, and of a pair of engagement sections that engage with each other, one of the engagement sections is formed on the placement surface, and the other engagement section is formed in the original holder body, and in a state in which the engagement sections are engaged with each other, the position of the original held by the original holder body is positioned at a position in which the image of the original can be read by the photoelectric conversion element.

* * * * *